US010546318B2

(12) United States Patent
Garcia

(10) Patent No.: US 10,546,318 B2
(45) Date of Patent: Jan. 28, 2020

(54) ADAPTIVELY EMBEDDING VISUAL ADVERTISING CONTENT INTO MEDIA CONTENT

(71) Applicant: INTEL CORPORATION, Santa Clara, CA (US)

(72) Inventor: Jason A. Garcia, Chandler, AZ (US)

(73) Assignee: INTEL Corporation, Santa Clara, CA (US)

(*) Notice: Subject to any disclaimer, the term of this patent is extended or adjusted under 35 U.S.C. 154(b) by 0 days.

(21) Appl. No.: 14/129,440

(22) PCT Filed: Jun. 27, 2013

(86) PCT No.: PCT/US2013/048235
§ 371 (c)(1),
(2) Date: Dec. 26, 2013

(87) PCT Pub. No.: WO2014/209324
PCT Pub. Date: Dec. 31, 2014

(65) Prior Publication Data
US 2016/0117722 A1    Apr. 28, 2016

(51) Int. Cl.
*G06Q 30/02* (2012.01)
*G06Q 50/10* (2012.01)
(Continued)

(52) U.S. Cl.
CPC ......... *G06Q 30/0251* (2013.01); *G06Q 30/02* (2013.01); *G06Q 50/10* (2013.01); *G06T 3/40* (2013.01); *G06T 7/70* (2017.01)

(58) Field of Classification Search
USPC ............... 705/14.73, 26.5, 14.4; 725/32; 455/414.1
See application file for complete search history.

(56) References Cited

U.S. PATENT DOCUMENTS 7,698,172 B2   4/2010  Chu
7,920,849 B2 * 4/2011  Pop .................. H04W 4/80
                                                455/414.1
(Continued)

FOREIGN PATENT DOCUMENTS

CN    101765856       6/2010
JP    H11-312072 A    11/1999
(Continued)

OTHER PUBLICATIONS

"Product placement," Wikipedia, the Free Encyclopedia, retrieved from: <http://en.wikipedia.org/w/index.php?title=Product_placement &oldid=530689404>, edited Jan. 1, 2013, 27 pages.
(Continued)

*Primary Examiner* — Saba Dagnew
(74) *Attorney, Agent, or Firm* — Barnes & Thornburg LLP

(57) ABSTRACT

Technologies for adaptively embedding visual advertising content into media content include a computing device for receiving visual advertisements, an advertisement map, and media content from a remote content provider. Such technologies may also include determining a location of an advertising enabled area within an image of the media content, selecting a visual advertisement to embed within the image of the media content at the determined location of the advertising enabled area as a function of the advertisement map, and embedding the selected visual advertisement into the image of the media content at the determined location of the advertising enabled area to generate augmented media content for subsequent display to the user. In some embodiments, the advertisement map includes display conditions for each of the visual advertisements.

22 Claims, 10 Drawing Sheets

(51) Int. Cl.
*G06T 3/40* (2006.01)
*G06T 7/70* (2017.01)

(56) References Cited

U.S. PATENT DOCUMENTS

| | | | | |
|---|---|---|---|---|
| 8,666,806 | B2* | 3/2014 | Rojas | G06Q 30/02 |
| | | | | 705/14.4 |
| 9,232,252 | B2* | 1/2016 | Eldering | H04N 7/165 |
| 9,544,631 | B2* | 1/2017 | Eldering | H04N 7/165 |
| 2002/0112249 | A1 | 8/2002 | Hendricks et al. | |
| 2002/0126990 | A1 | 9/2002 | Rasmussen | |
| 2003/0093784 | A1 | 5/2003 | Dimitrova et al. | |
| 2006/0026628 | A1* | 2/2006 | Wan | H04N 5/272 |
| | | | | 725/32 |
| 2006/0206380 | A1 | 9/2006 | Joo | |
| 2006/0256133 | A1 | 11/2006 | Rosenberg | |
| 2006/0287915 | A1 | 12/2006 | Boulet et al. | |
| 2008/0033801 | A1 | 2/2008 | McKenna et al. | |
| 2008/0033812 | A1 | 2/2008 | McKenna et al. | |
| 2008/0046920 | A1 | 2/2008 | Bill | |
| 2008/0319844 | A1* | 12/2008 | Hua | G06Q 30/02 |
| | | | | 705/14.73 |
| 2009/0094637 | A1 | 4/2009 | Lemmons | |
| 2009/0125226 | A1 | 5/2009 | Laumeyer | |
| 2009/0300677 | A1 | 12/2009 | Zalewski | |
| 2010/0070996 | A1 | 3/2010 | Liao et al. | |
| 2010/0228626 | A1 | 9/2010 | Im | |
| 2011/0082915 | A1 | 4/2011 | Carr | |
| 2011/0188836 | A1 | 8/2011 | Popkiewicz et al. | |
| 2012/0158502 | A1 | 6/2012 | Chung et al. | |
| 2013/0006866 | A1 | 1/2013 | Pendakur et al. | |
| 2013/0091519 | A1 | 4/2013 | McLauchlan et al. | |
| 2013/0243270 | A1 | 9/2013 | Kamhi et al. | |
| 2013/0278635 | A1* | 10/2013 | Maggiore | G06T 19/006 |
| | | | | 345/633 |
| 2014/0095341 | A1* | 4/2014 | Woods | G06Q 30/06 |
| | | | | 705/26.5 |
| 2014/0195328 | A1 | 7/2014 | Ferens et al. | |
| 2016/0212455 | A1 | 7/2016 | Manna | |

FOREIGN PATENT DOCUMENTS

| | | |
|---|---|---|
| JP | 2004-185456 A | 7/2004 |
| JP | 2007528680 | 11/2007 |
| KR | 1020060099367 | 9/2006 |
| KR | 1020060099367 A | 9/2006 |

OTHER PUBLICATIONS

"Geometric modeling," Wikipedia, the Free Encyclopedia, retrieved from: <http://en.wikipedia.org/w/index.php?title=Geometric_modeling&oldid=528981570>, edited Dec. 20, 2012, 2 pages.

"Chroma key," Wikipedia, the Free Encyclopedia, retrieved from: <http://en.wikipedia.org/w/index.php?title=Chroma_key&oldid=526780658>, edited Dec. 6, 2012, 7 pages.

"Machine vision," Wikipedia, the Free Encyclopedia, retrieved from: <http://en.wikipedia.org/w/index.php?title=Machine_vision&oldid=526331389>, edited Dec. 4, 2012, 4 pages.

"Computer vision," Wikipedia, the Free Encyclopedia, retrieved from: <http://en.wikipedia.org/w/index.php?title=Computer_vision&oldid=517888680>, edited Oct. 15, 2012, 8 pages.

"Feature detection (computer vision)," Wikipedia, the Free Encyclopedia, retrieved from: <http://en.wikipedia.org/w/index.php?title=Feature_detection_(computer_vision)&oldid=517191243>, edited Oct. 11, 2012, 4 pages.

"Targeted advertising," Wikipedia, the Free Encyclopedia, retrieved from: <http://en.wikipedia.org/w/index.php?title=Targeted_advertising&oldid=499079396>, edited Jun. 24, 2012, 3 pages.

International Search Report and Written Opinion received for International Application No. PCT/US2013/048235, dated Apr. 1, 2014, 11 pages.

Notice of Preliminary Rejection and English Translation for Korean Patent Application No. 2015-7033702, dated Nov. 11, 2016, 12 pages.

European Search Report for Patent Application No. 13900867.6-1995/3014551, dated Dec. 14, 2016, 7 pages.

International Search Report and Written Opinion received for International Application No. PCT/US2013/077581, dated Apr. 21, 2014, 12 pages.

Viola et al., "Rapid Object Detection Using a Boosted Cascade of Simple Features," Accepted Conference on Computer Vision and Pattern Recognition 2001, 9 pages.

Notice of Reasons for Rejections and English Translation for Japanese Patent Application No. 2016-519485, dated Feb. 15, 2017, 7 pages.

Office Action and English Translation for Korean Patent Application No. 2015-7033702, dated May 31, 2017, 11 pages.

First Office action in Chinese patent application No. 201380076967.1, dated Feb. 27, 2019, including machine translation (12 pages).

Second Office action in Chinese patent application No. 201380076967.1, dated Aug. 12, 2019, including machine translation (11 pages).

* cited by examiner

| CONDITION | ADVERTISEMENT | DISPLAY AREA LOCATOR | ADVERTISER | ADVERTISING SEQUENCE | FRAME START | FRAME END |
|---|---|---|---|---|---|---|
| 1A | PIZZA BRAND | ● | RESTAURANT CHAIN | 15 | 0:42:23.27 | 0:42:53.42 |
| 1B | FINE DINING RESTAURANT | ● | RESTAURANT CHAIN | 15 | 0:42:23.27 | 0:42:53.42 |
| 1C | FAST FOOD BRAND | ● | RESTAURANT CHAIN | 15 | 0:42:23.27 | 0:42:53.42 |
| 2A | LUXURY HOTEL BRAND | ■ | HOTEL CHAIN INC. | 15 | 0:42:23.27 | 0:42:53.42 |
| 2B | EXTENDED STAY HOTEL BRAND | ■ | HOTEL CHAIN INC. | 15 | 0:42:23.27 | 0:42:53.42 |
| 2C | HOTEL LOYALTY PROGRAM | ■ | HOTEL CHAIN INC. | 15 | 0:42:23.27 | 0:42:53.42 |
| 3A | LUXURY CAR BRAND | ◆ | CAR CO. | 15 | 0:42:23.27 | 0:42:53.42 |
| 3B | ECONOMY CAR BRAND | ◆ | CAR CO. | 15 | 0:42:23.27 | 0:42:53.42 |
| 3C | CAR LEASE PROMOTION | ◆ | CAR CO. | 15 | 0:42:23.27 | 0:42:53.42 |

FIG. 7

ADAPTIVELY EMBEDDING VISUAL ADVERTISING CONTENT INTO MEDIA CONTENT

CROSS REFERENCE TO RELATED APPLICATIONS

This application is a national stage entry under 35 USC § 371(b) of International Application No. PCT/US2013/048235, which was filed Jun. 27, 2013.

BACKGROUND

Mass media advertising has become a ubiquitous tool for enabling companies to reach large numbers of consumers. A popular form of mass media advertising among companies is product placement. In this form of advertising, a company typically pays to have its brand or product incorporated into mass media content (e.g., a television show, a movie, a video game, etc.). Subsequently, when a person views the mass media content, the person is exposed to the company's product or brand.

Although product placement reaches a large number of consumers, it is a static form of advertising. That is, the placement of products or brands into media content is typically done when the content is created and, as a result, cannot be changed later. Therefore, the products or brands placed within the media content typically are not customized to the consumer of the media content and cannot be changed to target different audiences without re-creating the media content. This generally makes conventional forms of product placement unsuitable for use in live media content (e.g., a sporting events, newscasts, televised awards shows, etc.) in which there is a desire to reach different target audiences.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 7 is an illustrative embodiment of an advertising map which may be used by the media consumption device of FIGS. 1 and 2 to embed visual advertising content;

DETAILED DESCRIPTION OF THE DRAWINGS

Figure 1:
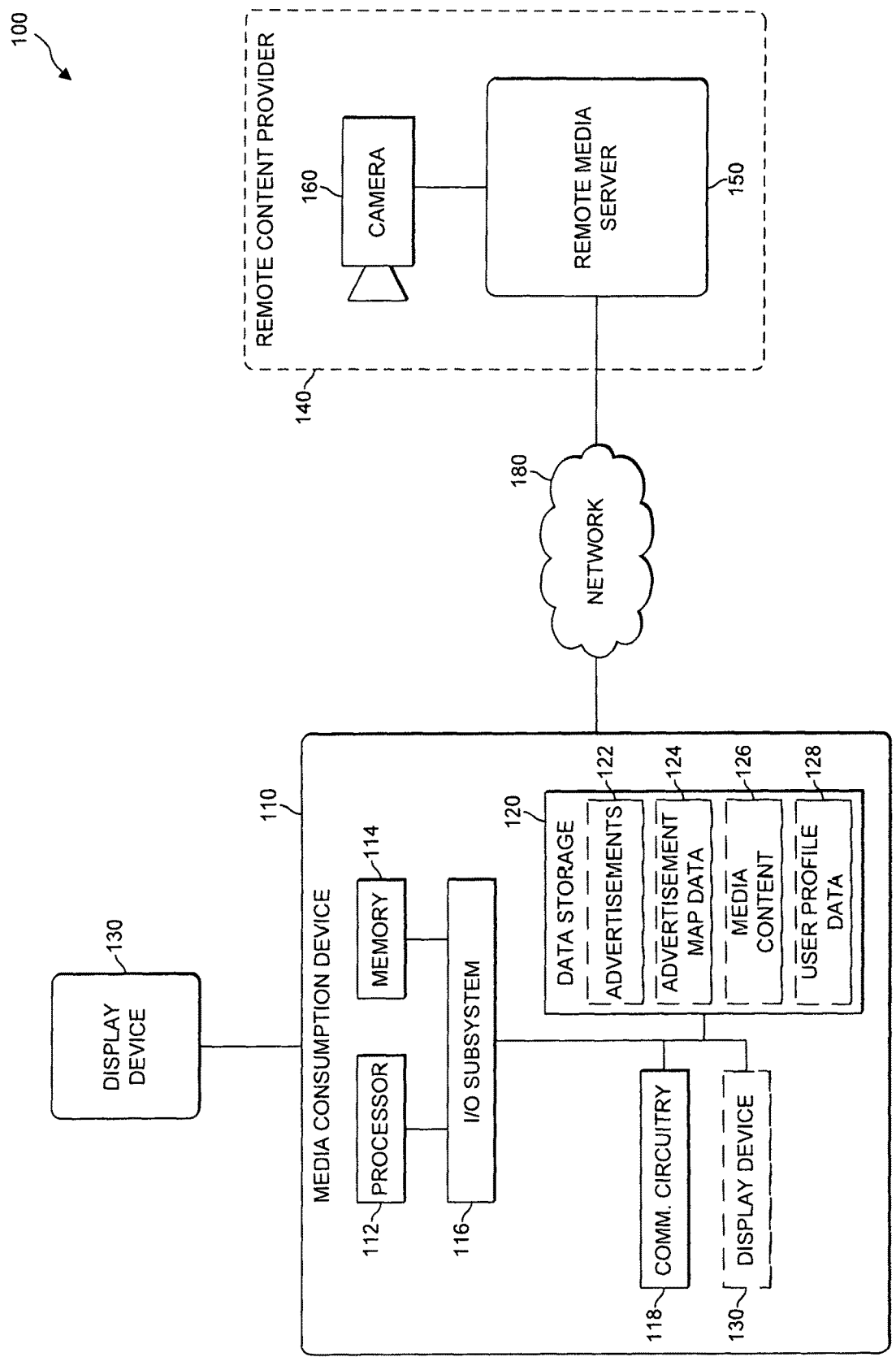
FIG. 1 is a simplified block diagram of at least one embodiment of a system for using a media consumption device to adaptively embed an advertisement into media content.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 6:
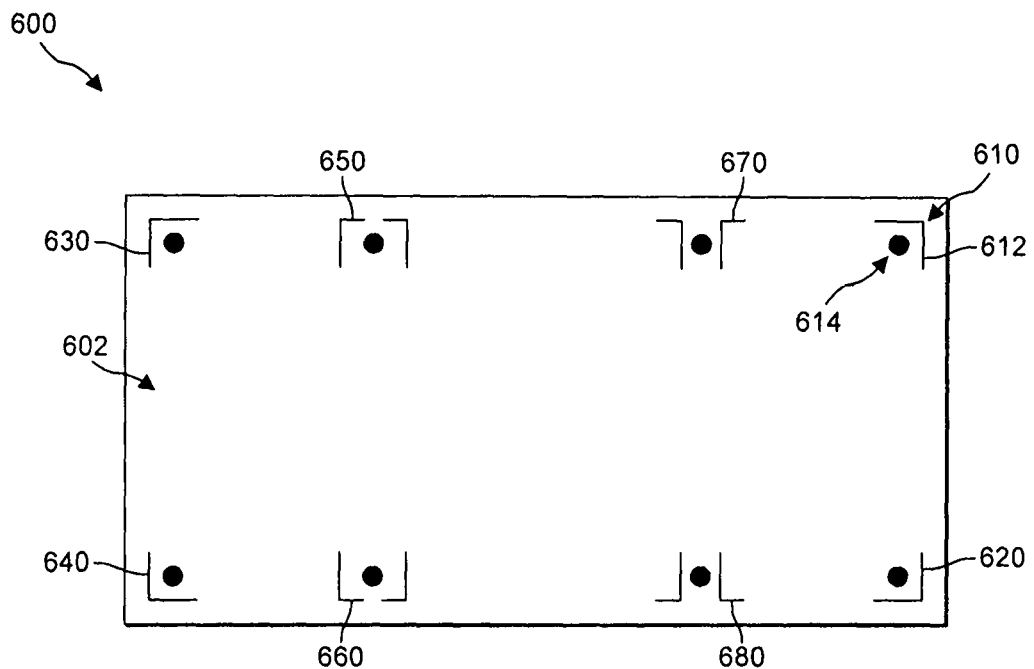
FIG. 6 is an illustrative embodiment of an advertising enabled area within which the media consumption device of FIGS. 1 and 2 may embed visual advertising content.

Referring now to FIG. 1, in an illustrative embodiment, a system 100 for adaptively embedding an advertisement into media content includes a media consumption device 110, a display device 130, and a remote content provider 140. In use, the media consumption device 110 is configured to determine a location (e.g., the advertising enabled area 600 of FIG. 6) within digital media content (e.g., video content, multimedia content, interactive web content, a video game, etc.) to adaptively embed an advertisement (e.g., a visual advertisement). The particular advertisement embedded within the media content may be selected based at least in part on, or otherwise as a function of, an advertisement map (e.g., the advertisement map 700 of FIG. 7) received from the remote content provider 140. As discussed in more detail below, the advertisement map 700 may include display conditions (e.g., conditions 702 of FIG. 7) for a plurality of visual advertisements (e.g., the advertisements 704 of FIG. 7), in some embodiments. In such embodiments, the media consumption device 110 may select a particular advertisement to embed within the advertising enabled area in response to determining that the display conditions 702 corresponding to one of the plurality of advertisements 704 have been satisfied. To do so, the media consumption device 110 may analyze user profile data 128 corresponding to a user (e.g., biographical information, demographical information, one or more user interests, online activity information, user preferences, etc.) to determine whether the display conditions 702 corresponding to one of the plurality of advertisements 704 has been satisfied.

Upon selecting a particular advertisement 704 based on the advertisement map 700, the media consumption device 110 may embed the visual advertisement 704 in the advertising enabled area 600. In some embodiments, the media consumption device 110 may determine the scale and orientation of advertising enabled area 600. In such embodiments, the media consumption device 110 may first scale and/or align the selected visual advertisement before embedding it into the advertising enabled area 600. The media consumption device 110 may also scale and align the selected advertisement into an advertising enabled area 600 appearing in more than one frame (e.g., multiple sequential video frames) of the media content. In that way, advertising content within the media content may be targeted to a particular user and adaptively embedded in one or more frames of the media content.

The media consumption device 110 may be embodied as any type of computing device capable of performing the functions described herein including, but not limited to, a desktop computer, a set-top box, a smart display device, a server, a mobile phone, a smart phone, a tablet computing consumption device, a personal digital assistant, a consumer electronic device, a laptop computer, a smart television, and/or other type of computing device and/or media consumption device. As shown in FIG. 1, the illustrative media consumption device 110 includes a processor 112, a memory 114, an input/output (I/O) subsystem 116, a data storage 120, and communication circuitry 118. Of course, the media consumption device 110 may include other or additional components, such as those commonly found in a server and/or computer (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 112 in some embodiments.

The processor 112 may be embodied as any type of processor capable of performing the functions described herein. For example, the processor 112 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the media consumption device 110 such as operating systems, applications, programs, libraries, and drivers. The memory 114 is communicatively coupled to the processor 112 via the I/O subsystem 116, which may be embodied as circuitry and/or components to facilitate input/output operations with the processor 112, the memory 114, and other components of the media consumption device 110. For example, the I/O subsystem 116 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 116 may form a portion of a system-on-a-chip (SoC) and be incorporated, along with the processor 112, the memory 114, and other components of the media consumption device 110, on a single integrated circuit chip.

The communication circuitry 118 of the media consumption device 110 may be embodied as any type of communication circuit, device, or collection thereof, capable of enabling communications between the media consumption device 110, the remote media server 150, and/or other computing devices. The communication circuitry 118 may be configured to use any one or more communication technologies (e.g., wireless or wired communications) and associated protocols (e.g., Ethernet, Wi-Fi®, WiMAX, etc.) to effect such communication. In some embodiments, the media consumption device 110 and the remote media server 150 may communicate with each other over a network 180.

The network 180 may be embodied as any number of various wired and/or wireless communication networks. For example, the network 180 may be embodied as or otherwise include a local area network (LAN), a wide area network (WAN), a cellular network, or a publicly-accessible, global network such as the Internet. Additionally, the network 180 may include any number of additional devices to facilitate communication between the media consumption device 110, the remote media server 150, and/or the other computing devices.

The data storage 120 may be embodied as any type of device or devices configured for short-term or long-term storage of data such as, for example, memory devices and circuits, memory cards, hard disk drives, solid-state drives, or other data storage devices. In the illustrative embodiment, the data storage 120 may include one or more visual advertisements 122, advertisement map data 124, media content 126, and user profile data 128. As discussed in more detail below, each of the one or more visual advertisements 122 may be embodied as one or more geometrically modeled advertisements (e.g., images) configured to be embedded within the advertising enabled area 600 by the media consumption device 110. Additionally, the advertisement map data 124 may include one or more advertisement maps 700, which as discussed in more detail below, may be received from the remote content provider 140 via the remote media server 150. The media content 126 may be embodied as any type of digital media content (standard video content, 3D video content, multimedia content, interactive web content, a video game, a live television broadcast, etc.). As discussed in more detail below, the user profile data 128 maintained in the data storage 120 may include information associated with a user of the media consumption device 110. For example, the user profile data 128 may include biographical information (e.g., characteristics corresponding to a particular user such as age, gender, residence, income, ethnicity, etc.), demographical information (e.g., biographical characteristics in common to a group of users, etc.), preferences, and/or online activity history (e.g., web searches, email content, social media posts, online purchases, etc.).

The display device 130 may be embodied as any type of display device capable of performing the functions described herein. For example, the display device 130 may be embodied as any type of display device capable of displaying media content to a user including, but not limited to, a television, a smart display device, a desktop computer, a monitor, a laptop computer, a mobile phone, a smart phone, a tablet computing device, a personal digital assistant, a consumer electronic device, a server, and/or any other display device. As discussed in more detail below, the display device 130 may be configured to present (e.g., display) media content including targeted and/or personalized advertising content embedded therein.

Additionally, although the display device 130 is separately connected to the media consumption device 110 in the illustrative embodiment of FIG. 1, it should be appreciated that display device 130 may be integral included in the media consumption device 110 in other embodiments. Regardless, the display device 130 may include, or otherwise use, any suitable display technology including, for example, a liquid crystal display (LCD), a light emitting diode (LED) display, a cathode ray tube (CRT) display, a plasma display, and/or other display usable in a media consumption device to display the media content.

The remote content provider 140 may be embodied as any type of content provider. For example, in some embodiments, the remote content provider 140 may be embodied as a television broadcast network configured to transmit television shows (e.g., live and/or pre-recorded television shows) to viewers (e.g., users) over-the-air or via the network 180. In such embodiments, the remote content provider 140 may include a camera 160 to capture and subsequently transmit live media content to viewers. Additionally or alternatively, the remote content provider 140 may be embodied as a streaming or an on-demand content provider. For example, in such embodiments, the remote content provider 140 may be configured to enable users to download pre-recorded media content via the network 180. In either case, the remote content provider 140 may include a remote media server 150.

The remote media server 150 may be embodied as any type of server or similar computing device capable of performing the functions described herein. As such, the remote media server 150 may include devices and structures commonly found in servers such as processors, memory devices, communication circuitry, and data storages, which are not shown in FIG. 1 for clarity of the description. As discussed in more detail below, the remote media server 150 is configured to provide media content (e.g., live video content, pre-recorded video content, multimedia content, interactive web content, video game content, etc.) to the media consumption device 110 for display on, for example, the display device 130. In some embodiments, the remote media server 150 is also configured to provide the media consumption device 110 with advertising content, which may be embedded into the media content at a location determined by the media consumption device 110. In other embodiments, the system 100 may include a separate advertisement server (not shown) configured to deliver visual advertisement content to the media consumption device 110.

Figure 2:
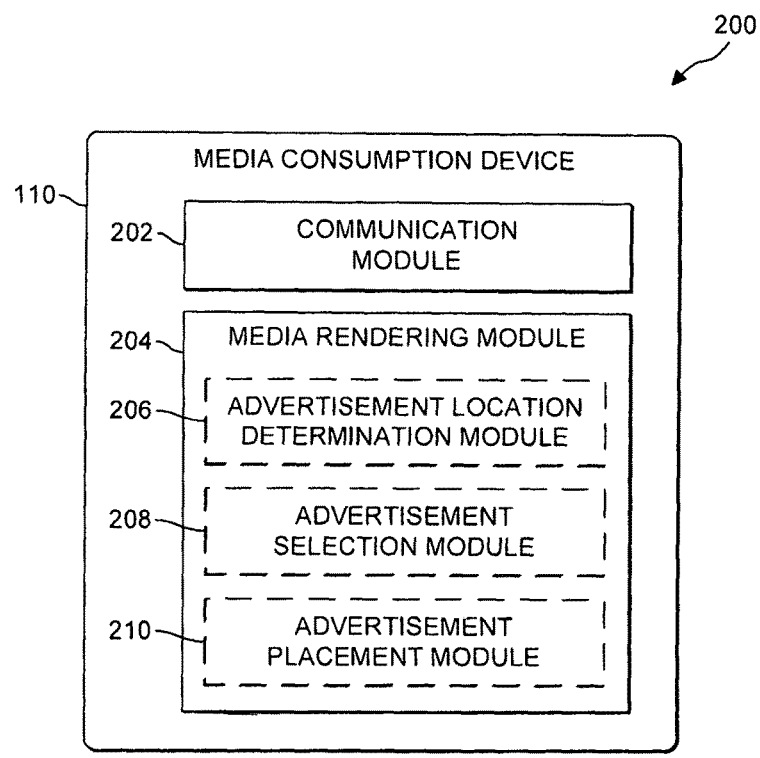
FIG. 2 is a simplified block diagram of at least one embodiment of an environment of the media consumption device of the system of FIG. 1.

Referring now to FIG. 2, in use, the media consumption device 110 establishes an environment 200 during operation. The illustrative environment 200 includes a communication module 202 and a media rendering module 204. As discussed in more detail below, the media rendering module 204 illustratively includes an advertisement location determination module 206, an advertisement selection module 208, and an advertisement placement module 210. Each of the modules 202, 204, 206, 208, 210 of the environment 200 may be embodied as hardware, software, firmware, or a combination thereof. It should be appreciated that the media consumption device 110 may include other components, sub-components, modules, and devices commonly found in a server, which are not illustrated in FIG. 2 for clarity of the description.

The communication module 202 of the media consumption device 110 facilitates communications between components or sub-components of the media consumption device 110 and the remote content provider 140 and/or the remote media server 150. For example, in some embodiments, the communication module 202 receives media content and/or advertising content from the remote media server 150. The media content provided by the remote media server 150 may be embodied as live video content, pre-recorded video content, multimedia content, interactive web content, on-demand video content, and/or any other type of content to be displayed to a user of the media consumption device 110.

The media rendering module 204 may be configured to detect and determine a location of an advertising enabled area 600 within the media content at which to embed a particular advertisement (e.g., a targeted advertisement). To do so, in some embodiments, the media rendering module 204 may include an advertisement location determination module 206. The advertisement location determination module 206 may be configured to automatically detect and locate an area or object located in one or more images of the media content (e.g., a scene or frame of a video or other visual media) that may be replaced with the selected advertisement. To do so, the advertisement location determination module 206 may be configured to utilize an image analysis procedure (e.g., an object detection algorithm, a feature detection algorithm, etc.) to locate an area or an object that may be replaced with the selected advertisement, which as discussed in more detail below, may be selected as a function the advertisement map and/or the user profile data 128 corresponding to the user of the media consumption device 110.

Figure 8A:
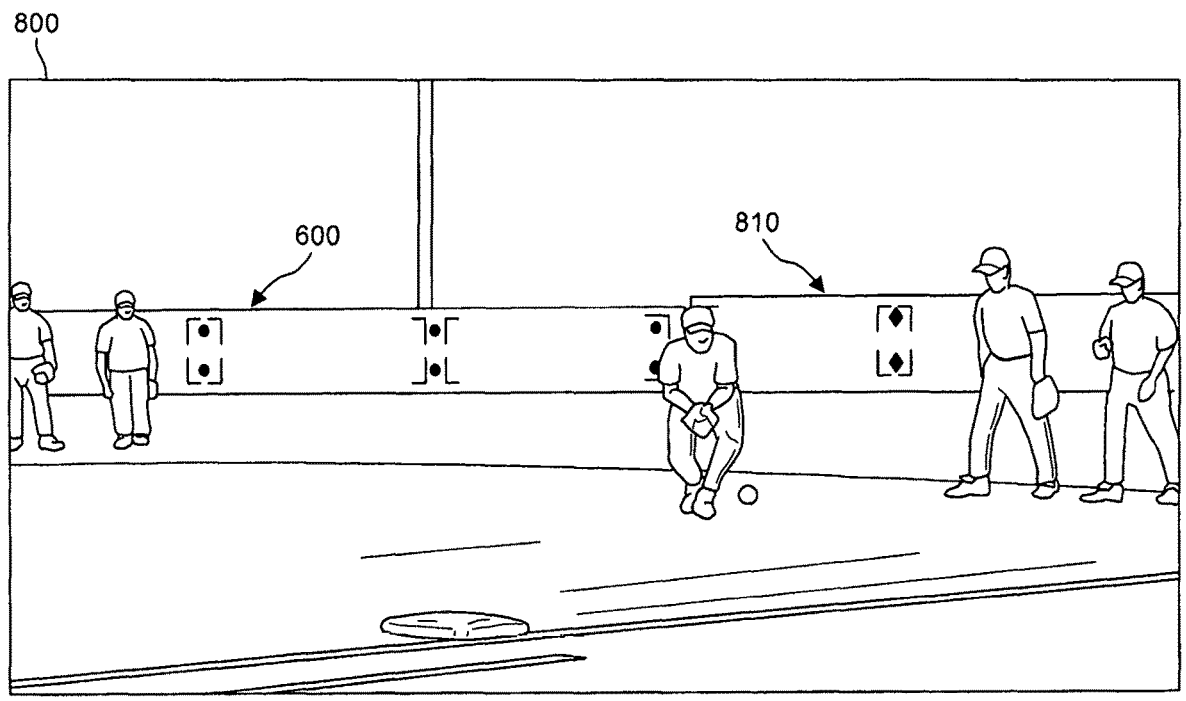
FIGS. 8A & 8B show an illustrative media content frame within which the media consumption device of FIGS. 1 and 2 may embed visual advertising content.
Figure 8B:
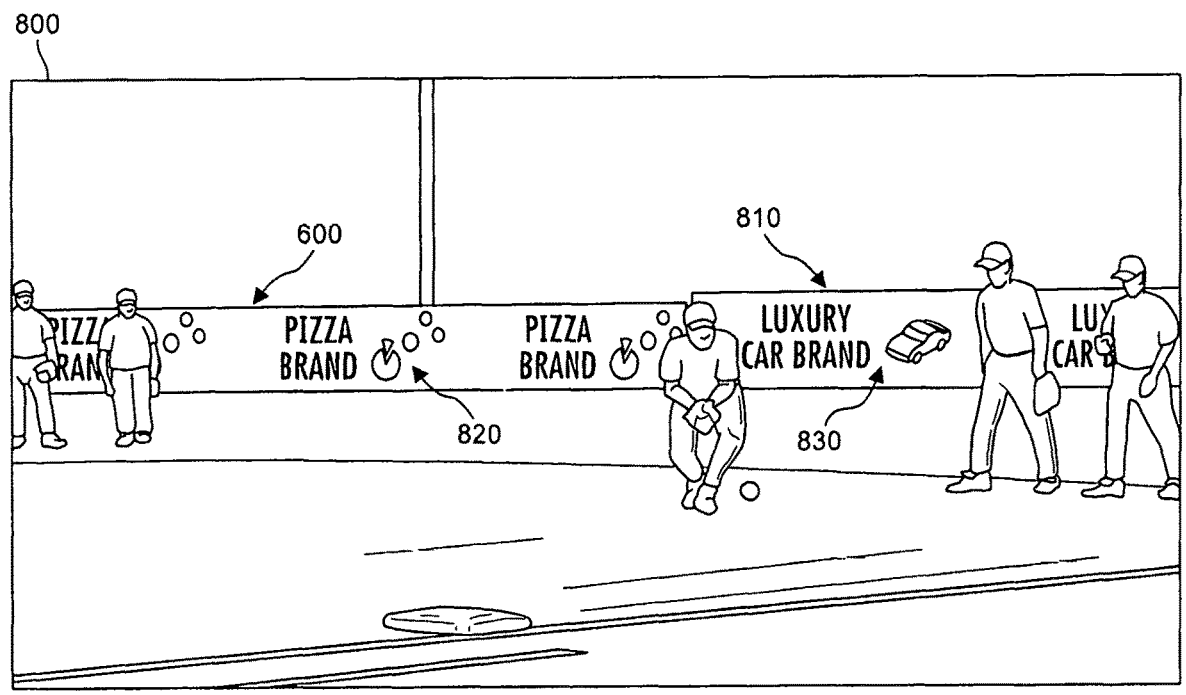

The area or object detected by the advertisement location determination module 206 may be embodied as any area, object, device, or structure displayed in the one or more images of the media content upon which advertising content may be displayed (e.g., a scoreboard, a billboard, product packaging, t-shirts, containers, bumper stickers, advertising banners, etc.). For example, as illustratively shown in FIG. 8A, the advertisement location determination module 206 may be configured to use object detection to determine the location of an advertising enabled area 600 (e.g., a ballpark advertising banner) existing in one or more images 800 (e.g., video frames) of the media content. Referring back to FIG. 2, it should also be appreciated that the advertisement location determination module 206 may also be configured to detect and locate more than one area or object located in one or more images of the media content. For example, as illustratively shown in FIG. 8A, the advertisement location determination module 206 may be configured to use an image analysis procedure (e.g., object detection, feature detection, etc.) to determine the location of the advertising enabled area 600 as well as the location of another advertising enabled area 810 within the image 800. As discussed in more detail below, the selected advertisement 820 (e.g., a product image, logo, slogan, graphic, etc.) may be embedded within the image 800 of the media content at the determined location of the detected advertising enabled area 600 (e.g., placed on or over the advertising enabled area 600) as illustratively shown in FIG. 8B. In embodiments wherein multiple advertising enabled areas 600, 810 are detected and located within the image 800 of the media content, different advertisements (e.g., the advertisement 820 and the advertisement 830) may be selected and embedded within the image 800 of the media content at the determined locations of the detected advertising enabled areas 600, 810. It should be appreciated that the advertisement location determination module 206 may detect and determine the location of any type of area or object existing in one or more images of the media content.

In some embodiments, each of the advertising enabled areas 600, 810 may include visual indicia and/or markings (e.g., characters, symbols, colors, etc.) to facilitate the advertisement location determination module 206 detecting and determining the location of the one or more advertising enabled areas 600, 810 within the one or more images 800 of the media content. For example, as illustratively shown in FIG. 6, the advertising enabled area 600 may include a plurality of visual indicia 610. In some embodiments, each of the plurality of visual indicia 610 may include a grouping of markings (e.g., characters, symbols, and/or colors), each of which may be used by the advertisement location determination module 206 and/or other modules of the media rendering module 204 for a different purpose. For example, each visual indicia 610 may include an identification marking 614 (e.g., a character, symbol, and/or color) to facilitate the advertisement location determination module 206 in uniquely identifying one advertising enabled area 600 from another advertising enabled area 810. To do so, each advertising enabled area 600, 810 may include a different identification marking 614 that may be recognized by the advertisement location determination module 206. For example, the advertising enabled area 600 may include a circle-shaped identification marking 614 whereas the advertising enabled area 810 (as illustratively shown in FIG. 8A) may include a diamond-shaped identification marking. It should be appreciated that although circle-shaped 614 and diamond-shaped identification markings are discussed in the illustrative embodiments, any other shape, character, and/or symbol may be used in other embodiments.

It should be appreciated that in some embodiments, each advertising enabled area (e.g., the advertising enabled area 600) may include a background color 602. In such embodiments, the background color 602 may also be used by the advertisement location determination module 206 to determine the location of each advertising enabled area (e.g., the advertising enabled area 600). As discussed in more detail below, the background color 602 may also be used by the media rendering module 204 and/or components of the media rendering module 204 to facilitate embedding the selected visual advertisement in one or more advertising enabled areas 600, 810.

The media rendering module 204 may also be configured to determine or otherwise select a particular advertisement to be targeted to the user of the media consumption device 110. To do so, the media rendering module 204 may include an advertisement selection module 208, which in some embodiments may be configured to select a particular visual advertisement from a plurality of visual advertisements received from the remote media server 150. In such embodiments, the advertisement selection module 208 may select the particular advertisement based at least in part on, or otherwise as a function of, an advertisement map (e.g., the advertisement map 700 illustratively shown in FIG. 7). As illustratively shown in FIG. 7, the advertisement map 700 may include one or more display conditions 702 required for each advertisement 704 to be displayed. As discussed in more detail below, each of the advertisements 704 may be associated with a visual advertisement configured to be embedded within an advertising enabled area (e.g., the advertising enabled area 600, the advertising enabled area 810, and/or any other advertising enabled area) and subsequently displayed to a user of the media consumption device 110 via the display device 130. Additionally, the advertisement map 700 may include information 706 indicative of the visual indicia 610 (e.g., the identification marking 614) corresponding to the advertising enabled area (e.g., the advertising enabled area 600) within which the selected visual advertisement should be embedded. It should be appreciated that the advertisement map 700 may include other types of information (e.g., an advertiser/sponsor name, an advertising sequence number, a starting frame time and an ending time frame, a target date for display, a target time period for display, etc.) to facilitate the advertisement selection module 208 in selecting a particular visual advertisement of the plurality of visual advertisements.

The display conditions 702 associated with each advertisement 704 may include one or more rules that must be satisfied before a particular advertisement is selected and/or subsequently displayed within an advertising enabled area (e.g., the advertising enabled area 600). For example, in some embodiments, the display conditions 702 may include one or more rules specifying which particular advertisements 704 should be embedded within what advertising enabled areas (e.g., the advertising enabled area 600, the advertising enabled area 810, etc.). Additionally or alternatively, the display conditions 702 may also include rules specifying which user and/or group of users a particular advertisement should be displayed via the display device 130. For example, in some embodiments, the display conditions 702 may specify that a particular advertisement 704 should be displayed to a specific user (e.g., a viewer) and/or group of users (e.g., viewers) based on demographical information, biographical information, interests, and/or preferences of the specific user and/or group of users. In that way, specific advertisements 704 may be targeted to specific users. In some embodiments, the display conditions 702 may include one or more rules specifying which particular advertisements 704 should be embedded within what advertising enabled areas (e.g., the advertising enabled area 600, the advertising enabled area 810, etc.) and during which particular time periods (e.g., months, days, weeks, times of day, etc.). For example, the display conditions 702 may specify that a particular advertisement 704 should be displayed to a specific user (e.g., a viewer) and/or group of users (e.g., viewers) during one week whereas a different advertisement 704 should be displayed to the specific user and/or group of users during the following week. In another example, the display conditions 702 may specify that a particular advertisement 704 should be displayed to a specific user and/or group of users during breakfast time (e.g., 7:00 AM through 10:00 AM, etc.) whereas a different advertisement 704 should be displayed to the specific user (e.g., a viewer) and/or group of users (e.g., viewers) during dinner time (e.g., 5:00 PM through 7:00 PM, etc.).

Referring back to FIG. 2, the advertisement selection module 208 may select the particular advertisement 704 based at least in part on the advertisement map 700 as discussed. In embodiments wherein the display conditions 702 include rules specifying which user and/or group of users a particular advertisement should be displayed based on demographic information, biographical information, user interests, and/or user preferences, the advertisement selection module 208 compares the user profile data 128 with the display conditions 702 included in the advertisement map 700. In some embodiments, the user profile data 128 may be retrieved from the data storage 120. Additionally or alternatively, the user profile data 128 may be received from the remote media server 150 and/or received from another remote computing device. As discussed, the user profile data 128 may include information indicative of the user's gender, age, marital status, and/or location. The user profile data 128 may also include information indicative of the identified user's preferences (e.g., brand preferences, product preferences, preferred price range preferences, merchant preferences, etc.). The user profile data 128 may also include any additional or other types of data that describe a characteristic and/or an attribute of the user. Regardless of the specific type of information included within the user profile data 128, the advertisement selection module 208 may determine whether the display conditions 702 for any of the advertisements 704 have been satisfied based on the user profile data 128. If so, the advertisement 704 corresponding to the display conditions 702 which were satisfied may be selected by the advertisement selection module 208. It should be appreciated that a particular advertisement 704 may be selected using any other technique for selecting which advertisements 704 should be displayed to one or more users.

The media rendering module 204 may also be configured to incorporate the selected advertising content into the media content. In some embodiments, the media rendering module 204 may include the advertisement placement module 210. The advertisement placement module 210 may be configured to replace or modify one or more of the advertising enabled areas 600, 810 located within one or more images 800 of the media content with the selected advertisement 820, 830. To do so, the advertisement placement module 210 may embed (e.g., replace, incorporate, superimpose, overlay, etc.) the selected advertisement 820, 830 into the media content at the identified location of the advertising enabled area 600, 810 to be replaced.

The selected advertisement may include or otherwise correspond to a visual advertisement, which may be embodied as a digital image of a product, logo, company, and/or service to be promoted. In some embodiments, the visual advertisement may be embodied as one or more actual digital images (e.g., un-modeled digital images) of a product, logo, company name, and/or server to be promoted. Additionally or alternatively, in some embodiments the visual advertisement may be embodied as a geometrically modeled image of a product, logo, company name, and/or service that can be rescaled, rotated, and/or skewed according to a size and/or orientation of one or more of the advertising enabled areas 600, 810. In such embodiments, the advertisement placement module 210 is configured to scale and/or align the selected advertisement based at least in part on, or otherwise as a function of, the size and orientation of the advertising enabled area 600, 810 within which the selected advertisement is to be embedded. To do so, the advertisement placement module 210 may be configured to first determine the scale and/or orientation of the advertising enabled area 600, 810.

As discussed, each of the advertising enabled areas 600, 810 may include a plurality of visual indicia 610 and/or markings (e.g., characters, symbols, colors, etc.). In some embodiments, the each of the visual indicia 610 includes a different scaling marking (e.g., a character, symbol, and/or color) which may be used by the advertisement placement module 210 to determine the scale and/or orientation of one or more of the advertising enabled areas 600, 810. For example, as illustratively shown in FIG. 6, the advertising enabled area 600 may include a plurality of scaling markings 612, 620, 630, 640, 650, 660, 670, 680. Each of the scaling markings 612, 620, 630, 640, 650, 660, 670, 680 may be used represent a different position and/or location within the advertising enabled area 600. For example, the scaling marking 612 may be placed in the upper right corner of the advertising enabled area 600; the scaling marking 620 may be placed in the lower right corner of the advertising enabled area 600; the scaling marking 630 may be placed in the upper left corner of the advertising enabled area 600; and the scaling marking 640 may be placed in the lower left corner of the advertising enabled area 600. Additionally, the scaling marking 650 may be placed between an upper center point of the advertising enabled area 600 and the scaling marking 630; the scaling marking 660 may be placed between a lower center point of the advertising enabled area 600 and the scaling marking 640; the scaling marking 670 may be placed between the upper center point of the advertising enabled area 600 and the scaling marking 612; and the scaling marking 680 may be placed between the lower center point of the advertising enabled area 600 and the scaling marking 620. It should be appreciated that although the advertising enabled area 600 includes eight scaling markings 612, 620, 630, 640, 650, 660, 670, 680 in the illustrative embodiment, the advertising enabled area 600 may include any other number of scaling markings (or identification markings) for increased and/or decreased redundancy. For example, in some embodiments, the advertising enabled area 600 may include additional scaling markings (not shown) to enable advertisement placement module 210 to calculate the curvature and/or account for variations in the surface tomography of the advertising enabled area 600. Additionally, in some embodiments, each of the scaling markings 612, 620, 630, 640, 650, 660, 670, 680 may be of a reference size and shape to facilitate determining the size and orientation of the advertising enabled area 600.

It should be appreciated that in some embodiments, the visibility of a portion of the advertising enabled area 600 and/or one or more of the plurality of indicia 610 may either be obstructed by an object (e.g., a person, a car, a building, etc.), or no longer in the field of view of the camera 160 (or an image of the media content captured by the camera 160). In such embodiments, the advertising enabled area 600 may include additional visual indicia 610 (e.g., scaling markings, identification markings, etc.) to facilitate locating, identifying, scaling and/or aligning the advertising enabled areas 600 and/or a particular advertisement irrespective of the obstructing object and/or the missing portion of the advertising enabled area 600.

Referring back to FIG. 2, after determining the scale and/or orientation of the advertising enabled area 600, 810, the advertisement placement module 210 may rescale, rotate, and/or skew (e.g., resize and/or reorient) the visual advertisement accordingly. Subsequently, the advertisement placement module 210, may embed (e.g., replace, incorporate, superimpose, overlay, etc.) the scaled and oriented visual advertisement into the media content at the identified location of the advertising enabled area 600, 810. In doing so, the media rendering module 204 generates augmented media content, which may be displayed for the user on the display device 130. It should be appreciated that the embedded visual advertisements within images (e.g., scenes and/or frames) of the augmented media content appears to the user (e.g., the viewer) to be a natural part of the media content. Additionally, it should also be appreciated that although the augmented media content includes the original media content modified by the selected visual advertisement in the illustrative embodiment, the augmented media content may include other types of content and information in other embodiments.

As discussed, in some embodiments, the visual advertisement may also be embodied as one or more actual digital images (e.g., un-modeled digital images) of a product, logo, company name, and/or server to be promoted. In such embodiments, a plurality of different digital images of the product logo, company name, and/or server from various perspectives may be captured and provided to the advertisement placement module 210. In such embodiments, the advertisement placement module 210 may be configured to embed (e.g., replace, incorporate, superimpose, overlay, etc.) one of the plurality of digital images of the product logo, company name, and/or server into the media content at the identified location of the advertising enabled area 600, 810 based on the perspective of the advertising enabled area. That is, the advertisement placement module 210 may be configured to embed the digital image having a perspective substantially similar to the perspective of the advertising enabled area 600, 810. In doing so, the media rendering module 204 may generate augmented media content, which may be displayed for the user on the display device 130.

Figure 3:
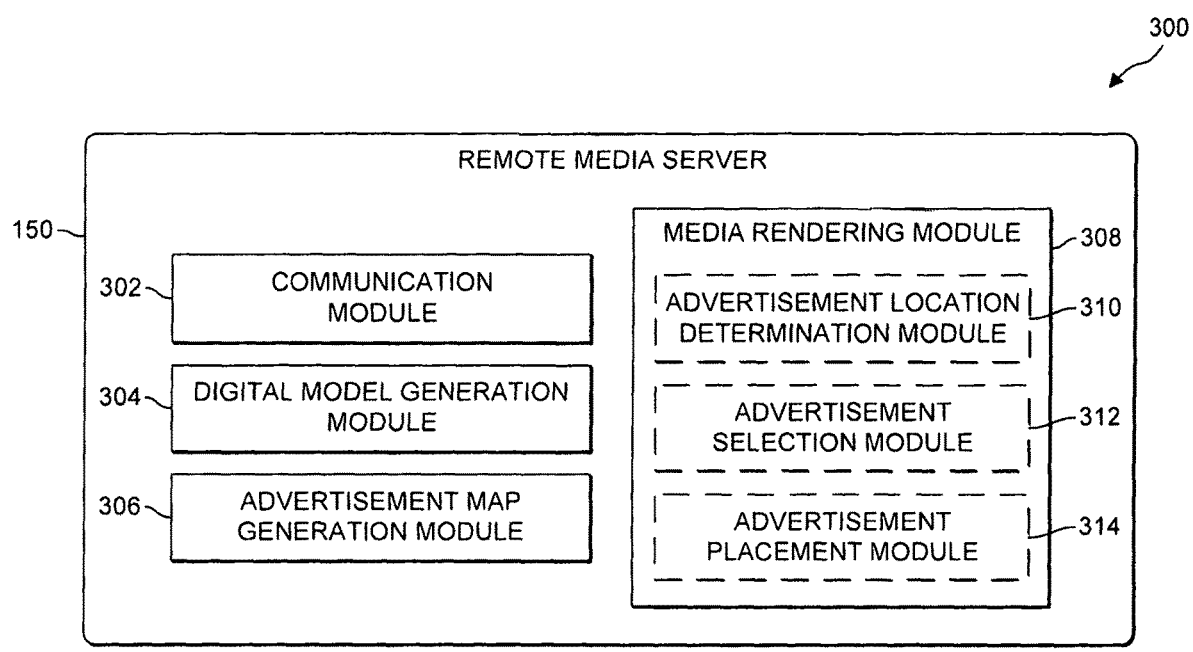
FIG. 3 is a simplified block diagram of at least one embodiment of an environment of the remote media server of the system of FIG. 1.

Referring now to FIG. 3, in use, the remote media server 150 establishes an environment 300 during operation. The illustrative environment 300 includes a communication module 302, a digital model generation module 304, an advertisement map generation module 306, and a media rendering module 308. As discussed in more detail below, the media rendering module 308 may, in some embodiments, include an advertisement location determination module 310, an advertisement selection module 312, and an advertisement placement module 314. Each of the modules 302, 304, 306, 308, 310, 312, 314 of the environment 300 may be embodied as hardware, software, firmware, or a combination thereof. It should be appreciated that the remote media server 150 may include other components, sub-components, modules, and devices commonly found in a server, which are not illustrated in FIG. 3 for clarity of the description.

The communication module 302 of the remote media server 150 facilitates communications between components or sub-components of the remote media server 150 and the media consumption device 110 and/or the remote content provider 140. For example, in some embodiments, the communication module 302 transmits or otherwise provides media content and/or advertising content to the media consumption device 110. The media content provided by the remote media server 150 may be embodied as live video content, pre-recorded video content, multimedia content, interactive web content, on-demand video content, and/or any other type of content to be displayed to a user of media consumption device 110.

In some embodiments, the remote media server 150 generates and provides media content, visual advertisements, and an advertisement map to the media consumption device 110. The media content, the visual advertisements, and the advertising map may each be provided to the media consumption device 110 at different times or at substantially similar times. For example, in some embodiments, the visual advertisements and the advertising map may be provided to the media consumption device 110 before the media content is provided. Regardless of the timing of when the media content, visual advertisements, and advertising map are provided, the media consumption device 110 may select and embed a particular advertisement within the media content to generate augmented media content as discussed above. The augmented media content generated by the media consumption device 110 may be displayed to the user (e.g., the viewer) via the display device 130. In other embodiments, the remote media server 150 may instead generate and provide the augmented media content to the media consumption device 110.

The digital model generation module 304 may be configured generate a visual advertisement that may later be resealed, rotated, and/or skewed according to a size and/or orientation of one or more of the advertising enabled areas 600, 810. To do so, in some embodiments, the digital model generation module 304 may geometrically model a digital image of a product, logo, company, and/or service to be promoted. For example, the digital image may be geometrically modeled according to any suitable modeling technology (e.g., 2D modeling, 3D modeling, etc.).

The advertisement map generation module 306 may generate the advertisement map 700, which as discussed, may be used by the media consumption device 110 to determine which advertisements should be embedded within what advertising enabled areas 600, 810. Additionally, in embodiments wherein the remote media server 150 generates and provides the augmented media content to the media consumption device 110, the advertisement map 700 may be used by the remote media server 150 to determine which advertisements should be embedded within what advertising enabled areas 600, 810.

As illustratively shown in FIG. 7, the advertisement map 700 may include one or more display conditions 702 required for each advertisement 704 to be displayed. As discussed, each of the advertisements 704 may be associated with a visual advertisement configured to be embedded within an advertising enabled area (e.g., the advertising enabled area 600, the advertising enabled area 810, and/or any other advertising enabled area) and subsequently displayed to a user of the media consumption device 110 via the display device 130. Additionally, the advertisement map 700 may include information indicative of the visual indicia 610 (e.g., the identification marking 614) corresponding to the advertising enabled area (e.g., the advertising enabled area 600) within which the selected visual advertisement should be embedded. It should be appreciated that the advertisement map 700 may include other types of information (e.g., advertiser/sponsor name, an advertising sequence number, a starting frame time and an ending time frame, a target date for display, a target time period for display, etc) to facilitate selecting a particular visual advertisement of the plurality of visual advertisements.

As discussed, the display conditions 702 associated with each advertisement 704 may include on or more rules that must be satisfied before a particular advertisement is selected and/or subsequently displayed an advertising enabled area (e.g., the advertising enabled area 600). Additionally or alternatively, the display conditions 702 may also include rules specifying which user and/or group of users a particular advertisement should be displayed via the display device 130. For example, in some embodiments, the display conditions 702 may specify that a particular advertisement 704 should be displayed to a specific user (e.g., a viewer) and/or group of users (e.g., viewers) based on demographical information, biographical information, interests, and/or preferences of the specific user and/or group of users. In some embodiments, the display conditions 702 may include one or more rules specifying which particular advertisements 704 should be embedded within what advertising enabled areas (e.g., the advertising enabled area 600, the advertising enabled area 810, etc.) and during which particular time periods (e.g., months, days, weeks, times of day, etc.). For example, the display conditions 702 may specify that a particular advertisement 704 should be displayed to a specific user (e.g., a viewer) and/or group of users (e.g., viewers) during one week whereas a different advertisement 704 should be displayed to the specific user and/or group of users during the following week. In another example, the display conditions 702 may specify that a particular advertisement 704 should be displayed to a specific user and/or group of users during breakfast time (e.g., 7:00 AM through 10:00 AM, etc.) whereas a different advertisement 704 should be displayed to the specific user (e.g., a viewer) and/or group of users (e.g., viewers) during dinner time (e.g., 5:00 PM through 7:00 PM, etc.).

Referring back to FIG. 3, the media rendering module 308 may be configured to generate or otherwise format the media content (e.g., live video content, pre-recorded video content, multimedia content, interactive web content, on-demand video content, etc.) for transmission to the media consumption device 110. In some embodiments, the media rendering module 308 may format or otherwise prepare video content captured by the camera 160 for transmission to the media consumption device 110. It should be appreciated that although the media rendering module 308 formats and/or prepares video content captured by the camera 160 in the illustrative embodiment, the media rendering module 308 may format and/or prepare media content received from other sources. For example, the media rendering module 308 may format and/or prepare media content received from another computing device of the remote content provider 140 and/or a remote computing device.

As discussed, in some embodiments, the remote media server 150 may generate and provide the augmented media content to the media consumption device 110. In such embodiments, the media rendering module 308 may include the advertisement location determination module 310, the advertisement selection module 312, and the advertisement placement module 314. The advertisement location determination module 310 may automatically detect and determine a location of an advertising enabled area 600, 810 within one or more images (e.g., scenes, frames, etc.) of the media content at which to embed a particular advertisement (e.g., a targeted advertisement). To do so, the advertisement location determination module 310 may be configured to utilize an image analysis procedure (e.g., an object detection algorithm, a feature detection algorithm, etc.) to locate the advertising enabled area 600, 810 that is to be replaced with the particular advertisement. The advertisement may be selected based at least in part on the advertisement map 700, which as discussed, may be generated by the advertisement map generation module 306. In some embodiments, the particular advertisement to embedded within the advertising enabled area 600, 810 may also be selected based at least in part on the user profile data 128, which may be received from the media consumption device 110.

The advertisement selection module 312 may be configured to select a particular visual advertisement from a plurality of visual advertisements. In such embodiments, the advertisement selection module 312 may select the particular advertisement based at least in part on, or otherwise as a function of, the advertisement map 700. In some embodiments, the advertisement selection module 312 may select the particular advertisement based at least in part on the advertisement map 700 and the user profile data 128, which may be received from the media consumption device 110, retrieved from local storage of the remote media server 150, and/or received from a remote computing device.

The advertisement placement module 314 may be configured to embed (e.g., replace, incorporate, superimpose, overlay, etc.) the selected visual advertisement within one or more of the advertising enabled areas 600, 810 located within one or more images of the media content. In some embodiments, the advertisement placement module 314 may be configured to scale and/or orient (e.g., align) the selected advertisement according to the size and/or orientation of the one or more advertising enabled areas 600, 810 prior to being embedded. In doing so, the media rendering module 308 generates augmented media content, which may be provided to the media consumption device for display on the display device 130.

Figure 4:
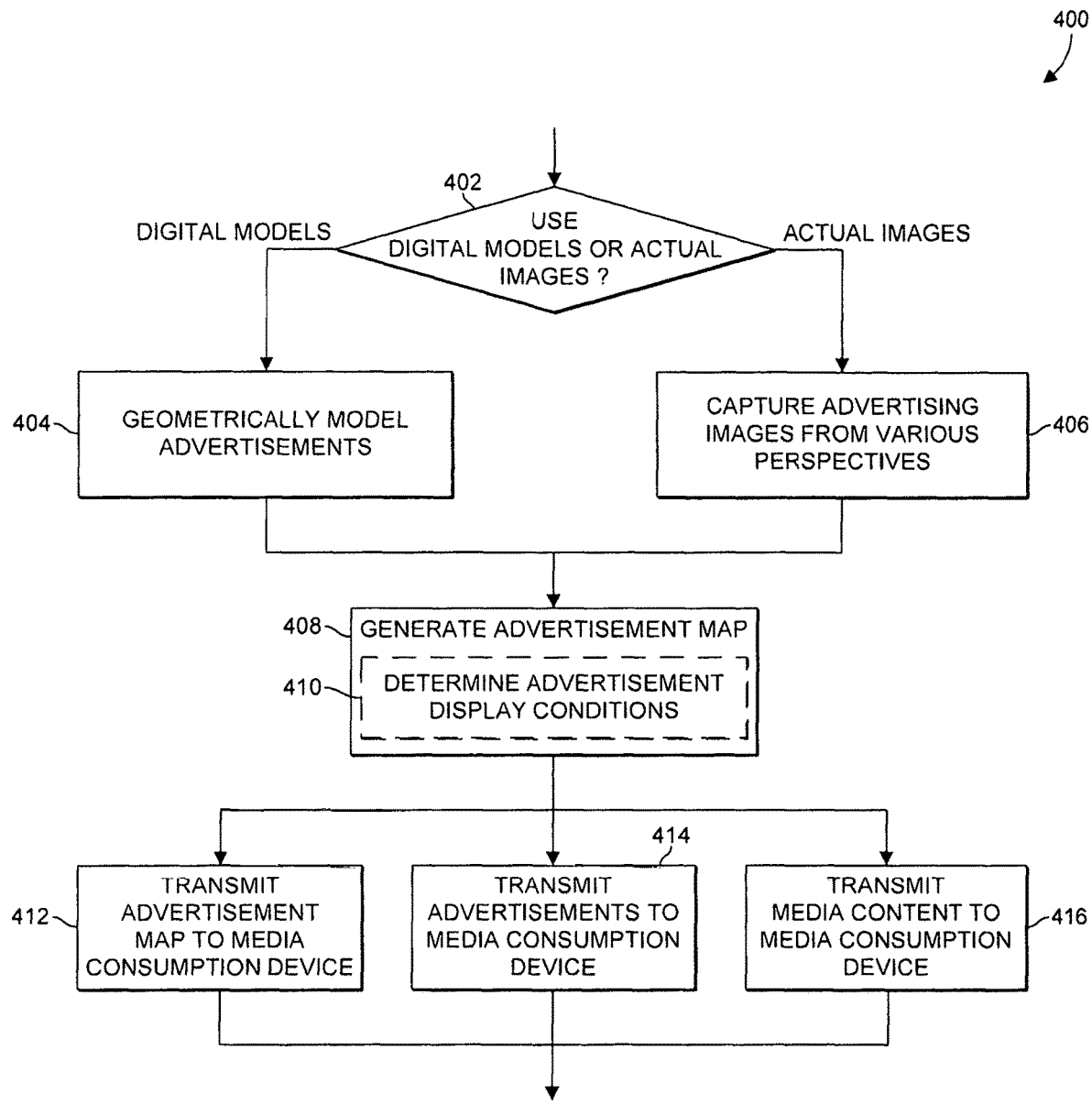
FIG. 4 is a simplified flow diagram of at least one embodiment of a method that may be executed by the remote media server of FIGS. 1 and 3 for generating visual advertising content.

Referring now to FIG. 4, in use, the remote media server 150 may execute a method 400 for generating visual advertising content. The method 400 begins with block 402 in which it is determined whether digital models and/or actual images of a product, logo, company, and/or service to be promoted are to be used. To do so, in some embodiments, one or more inputs (e.g. a touch screen, a keyboard, a mouse, a user interface, a voice recognition interface, remote control commands, prompts, network request, etc.) of the remote media server 150 are monitored to determine whether usage of digital models or actual images is requested and/or required. If, in block 402, it is determined that usage of digital models has been requested and/or required, the method 400 advances to block 404. If, however, it is determined that usage of actual images are requested and/or required, the method 400 advances instead to block 406.

In block 404, the remote media server 150 generates a visual advertisement that may later be rescaled, rotated, and/or skewed according to a size and/or orientation of one or more of advertising enabled areas 600, 810. To do so, in some embodiments, the remote media server 150 geometrically models a digital image of a product, logo, company, and/or service to be promoted. For example, the digital image may be geometrically modeled according to any suitable modeling technology (e.g., 2D modeling, 3D modeling, etc.).

In embodiments wherein usage of actual images are requested and/or required, the remote media server 150, in block 406, may capture actual images (e.g., digital images) of the product, logo, company name, and/or service to be promoted from various perspectives. For example, a digital image of a particular product to be promoted may be captured in each possible scale and orientation of the one or more advertising enabled areas 600, 810. In some embodiments, the remote media server 150 may receive the actual images of the product, logo, company name, and/or server from the camera 160 and/or another source (e.g., a remote computing device).

In block 408, the remote media server 150 generates an advertisement map 700, which may be used by the media consumption device 110 and/or the remote media server 150 110 to determine which advertisements should be embedded within what advertising enabled areas 600, 810. The advertisement map 700 includes one or more display conditions 702 (e.g., rules) required for each advertisement 704 to be selected and/or displayed in one or more of the advertising enabled areas 600, 810. In some embodiments, in block 410, the remote media server 150 may determine the display conditions 702 to include within the advertisement map 700. To do so, in some embodiments, the remote media server 150 analyzes user profile data 128 (e.g., age, gender, ethnicity, income level, location, martial status, preferences, etc.), advertisement sponsor requirements (e.g., target audience, advertisement running costs, requested display time, etc.), and/or media content requirements (e.g., maximum advertisement size or length, permitted advertisement content, etc.) and generates the display conditions 702 therefrom. It should be appreciated, however, that the remote media server 150 may also use any other information to determine the display conditions 702. Additionally, the advertisement map 700 may include information indicative of the visual indicia 610 (e.g., the identification marking 614) corresponding to the advertising enabled area 600, 810 within which the selected visual advertisement should be embedded. It should be appreciated that the advertisement map 700 may include other types of information (e.g., advertiser/sponsor name, an advertising sequence number, and a starting frame time and an ending time frame, etc.).

In block 412, the remote media server 150 transmits the advertisement map 700 to the media consumption device 110. In block 414, the remote media server 150 transmits one or more visual advertisements to the media consumption device 110. Additionally, in block 416, the remote media server 150 transmits the media content to the media consumption device 110. It should be appreciated that although blocks 412, 414, and 416 are shown as being performed by the remote media server 150 concurrently in the illustrative embodiment, the remote media server 150 may perform blocks 412, 414, and 416 in any order. For example, in some embodiments, the remote media server 150 may transmit, in blocks 412 and 414, the advertisement map 700 and the visual advertisements to the media consumption device 110 prior to transmitting, in block 416, the media content to the media consumption device 110. It should be appreciated that transmitting the advertisement map 700 and the visual advertisements prior to transmitting the media content may facilitate embedding visual advertisements within live video content. As another example, the remote media server 150 may transmit the advertisement map 700 and/or an updated advertisement map (not shown) to the media consumption device 110 according to a reference time interval (e.g., once a week, once a day, once an hour, etc.) and/or in response to the occurrence of one or more trigger events (e.g., detected channel change, new media content requested, detected scheduling changes, user request, etc.). In that way, the advertisement map 700 currently in use by the media consumption device 110 may be continuously updated by the remote media server 150. Additionally or alternatively, in some embodiments, the remote media server 150 may instead transmit augmented media content (e.g., media content already including the visual advertisements embedded therein) to the media consumption device 110.

Figure 5:
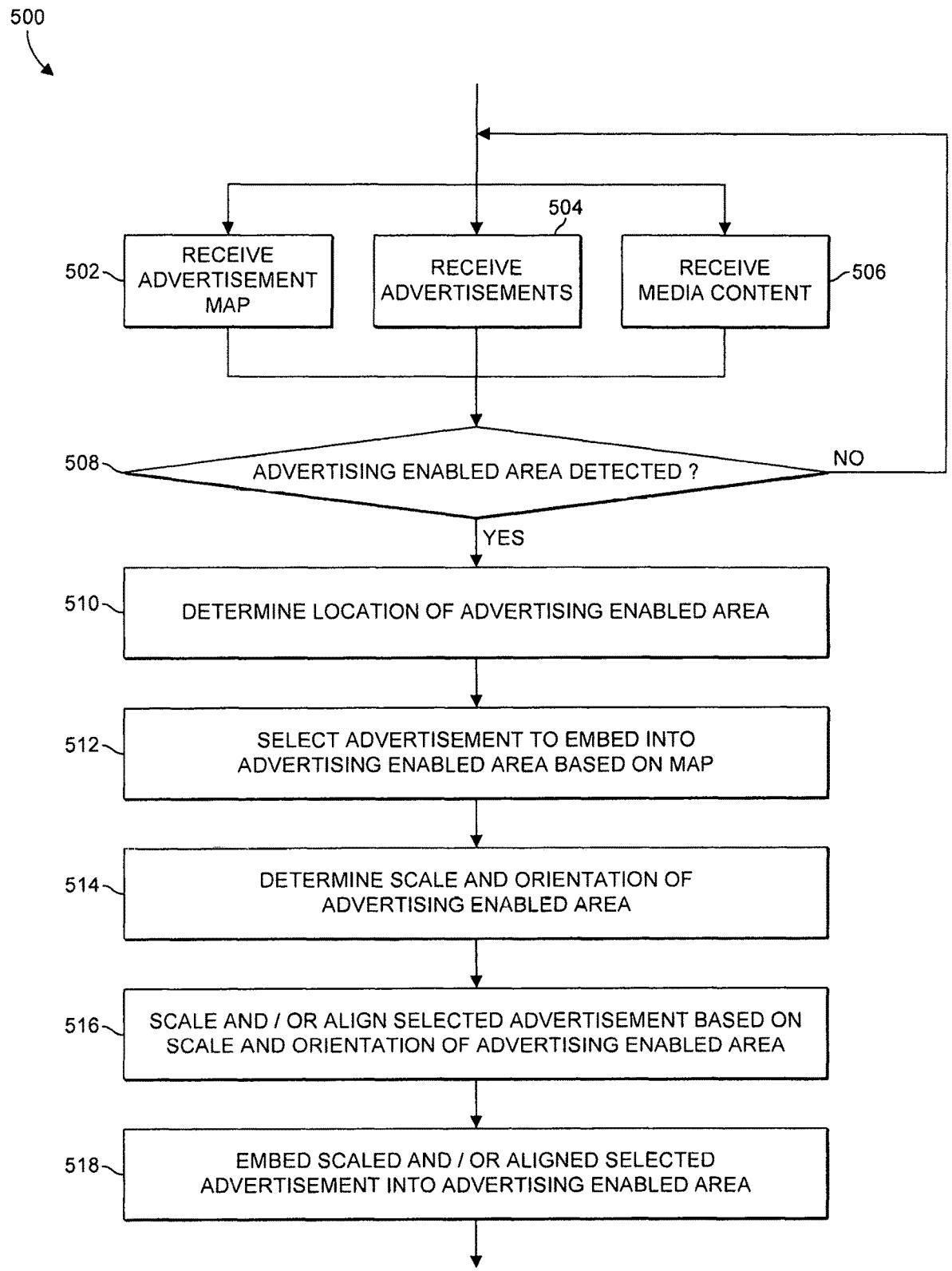
FIG. 5 is a simplified flow diagram of at least one embodiment of a method that may be executed by the media consumption device of FIGS. 1 and 2 for adaptively embedding an advertisement into media content.

Referring now to FIG. 5, in use, the media consumption device 110 may execute a method 500 for adaptively embedding advertisements into media content. The method 500 begins with block 502 in which the media consumption device 110 receives the advertisement map 700 from the remote media server 150. In block 504, the media consumption device 110 receives one or more visual advertisements from the remote media server 150. Additionally, in block 506, the media consumption device 110 receives the media content from the remote media server 150. It should be appreciated that although blocks 502, 504, and 506 are shown as being performed by the media consumption device 110 concurrently in the illustrative embodiment, the media consumption device 110 may perform blocks 502, 504, and 506 in any order. For example, in some embodiments, the media consumption device 110 may receive, in blocks 502 and 504, the advertisement map 700 and the visual advertisements from the remote media server 150 prior to receiving, in block 506, the media content from the remote media server 150. It should be appreciated that receiving the advertisement map 700 and the visual advertisements prior to receiving the media content may facilitate embedding visual advertisements within live video content. As another example, the media consumption device 110 may receive the advertisement map 700 and/or an updated advertisement map (not shown) from the remote media server 150 according to a reference time interval (e.g., once a week, once a day, once an hour, etc.) and/or in response to the occurrence of one or more trigger events (e.g., detected channel change, new media content requested, detected scheduling changes, user request, etc.). In that way, the advertisement map 700 currently in use by the media consumption device 110 may be continuously updated. Additionally or alternatively, in some embodiments, the media consumption device 110 may instead receive augmented media content (e.g., media content already including the visual advertisements embedded therein) from the remote media server 150.

In block 508, the media consumption device 110 detects whether one or more advertising enabled areas are located within an image (e.g., a frame and/or scene) of the media content. For example as illustratively shown in FIG. 8A, the media consumption device 110 detects that the advertising enabled areas 600, 810 are located within the image 800 of the media content. To do so, referring back to FIG. 5, the media consumption device 110 utilizes an image analysis procedure such as, for example, an object detection algorithm to detect the one or more advertising enabled areas 600, 810 included within the media content. If, in block 508, the media consumption device 110 detects one or more advertising enabled areas 600, 810 within the image 800 of the media content, the method 500 advances to block 510. If, however, the media consumption device 110 determines instead that one or more advertising enabled areas 600, 810 have not been detected within the image 800 of the media content, the method 500 loops back to blocks 502, 504, and 506 to receive new and/or additional advertisement maps, visual advertisements, and/or media content from the remote media server 150.

In block 510, the media consumption device 110 determines the location of the one or more advertising enabled areas 600, 810 (e.g., a ballpark advertising banner) existing with the image 800 of the media content. To do so, the media consumption device 110 uses image analysis (e.g., object detection, feature detection, etc.) to determine the location of the one or more advertising enabled areas 600, 810 within the image 800. In some embodiments, the media consumption device 110 detects one or more visual indicia located on the one or more advertising enabled areas 600, 810 to facilitate determining the location and identity of the one or more advertising enabled areas 600, 810. After determining the location of the one or more advertising enabled areas 600, 810, the method 500 advances to block 512.

Subsequently, in block 512, the media consumption device 110 determines or otherwise selects a particular visual advertisement from a plurality of visual advertisements to be embedded within each of the one or more advertising enabled areas 600, 810 detected and located within the image 800 of the media content. To do so, the media consumption device 110 determines whether one or more display conditions 702 included in the advertisement map 700 received from the remote media server 150 is satisfied. In some embodiments, the media consumption device 110 compares the user profile data 128 to the display conditions 702 to determine whether any have been satisfied. In response to determining that one of the display conditions 702 has been satisfied, the media consumption device 110 selects the advertisement corresponding to the satisfied display condition 702. After selecting the particular visual advertisement to embed within the image 800 of the media content, the method 500 advances to block 514.

In some embodiments, the media consumption device 110 scales and/or aligns the selected advertisement based at least in part on, or otherwise as a function of, the size and orientation of the one or more advertising enabled areas 600, 810 within which the selected advertisement is to be embedded. To do so, in block 514, the media consumption device first determines the scale and/or orientation of the one or more advertising enabled areas 600, 810. In some embodiments, the media consumption device 110 detects one or more visual indicia located (e.g., scaling marks, etc.) on the one or more advertising enabled areas 600, 810 to facilitate scaling and/or aligning the selected advertisement as a function of the size and orientation of the one or more advertising enabled areas 600, 810 within which the selected advertisement is to be embedded. It should be appreciated that although the media consumption device 110 detects one or more visual indicia located on the one or more advertising enabled areas 600, 810 to facilitate scaling and/or aligning the selected advertisement, the media consumption device 110 may also detect other objects within the image 800. For example, in some embodiments, the media consumption device 110 detects one or more unique objects (e.g., a wall phone, a picture frame, a lamp, a corner or edge of the advertising enabled areas 600, 810, etc.) having a fixed positional relationship to the advertising enabled areas 600, 810. In such embodiments, the media consumption device 110 uses the one or more detected objects to calculate the size and orientation of the one or more advertising enabled areas 600, 810.

Subsequently, in block 516, the media consumption device 110 rescales, rotates, and/or skews (e.g., resizes and/or reorients) the visual advertisement based at least in part on the determined scale and/or orientation of the one or more advertising enabled areas 600, 810. In some embodiments, the visual advertisement rescaled, rotated, and/or skewed by the media consumption device 110 is embodied as a geometrically modeled digital image of the product, logo, company, and/or service to be promoted.

In block 518, the media consumption device 110 embeds (e.g., replaces, incorporates, superimposes, overlays, etc.) the scaled and oriented visual advertisement into the media content at the identified location of the one or more advertising enabled areas 600, 810. In doing so, the media consumption device 110 generates augmented media content, which may be displayed for the user on the display device 130.

It should be appreciated that in some embodiments, the remote media server 150 generates the augmented media content including the visual advertisements already embedded therein. In such embodiments, only the augment media content may be received from the remote media server 150 and displayed for the user on the display device 130.

Figure 9A:
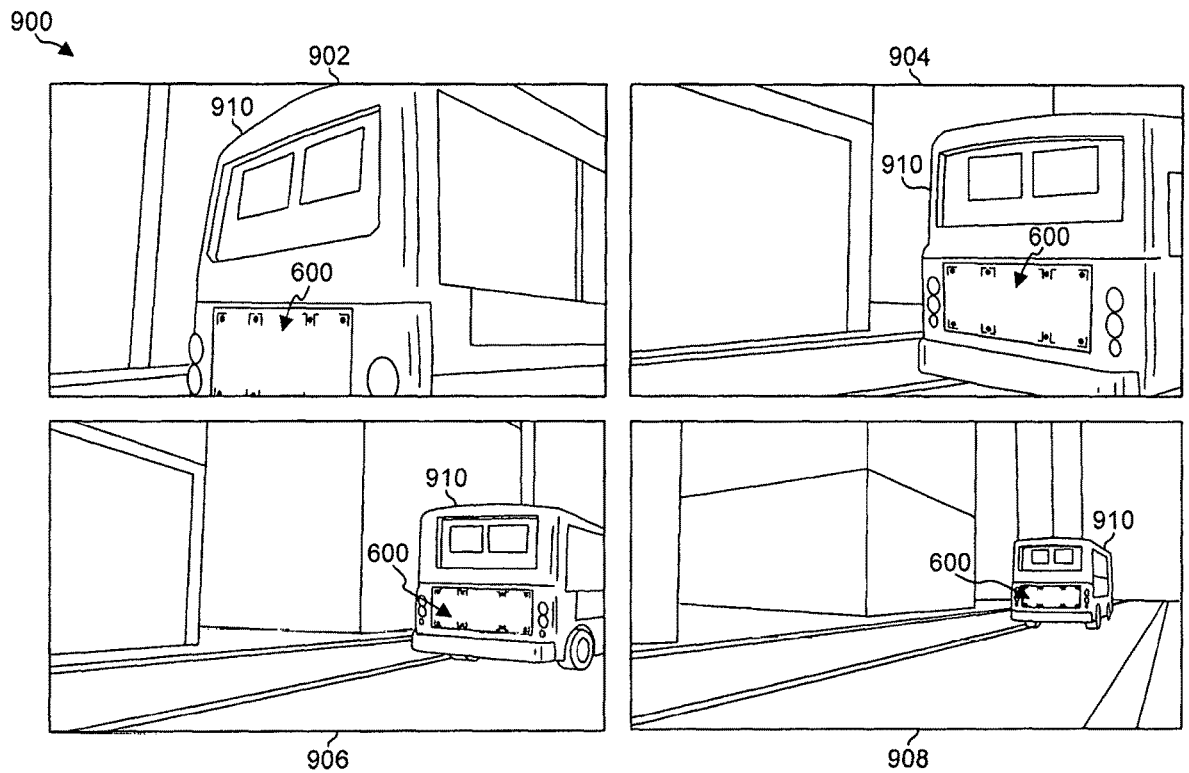
FIGS. 9A & 9B show a series of illustrative media content frames within which the media consumption device of FIGS. 1 and 2 may embed visual advertising content.
Figure 9B:
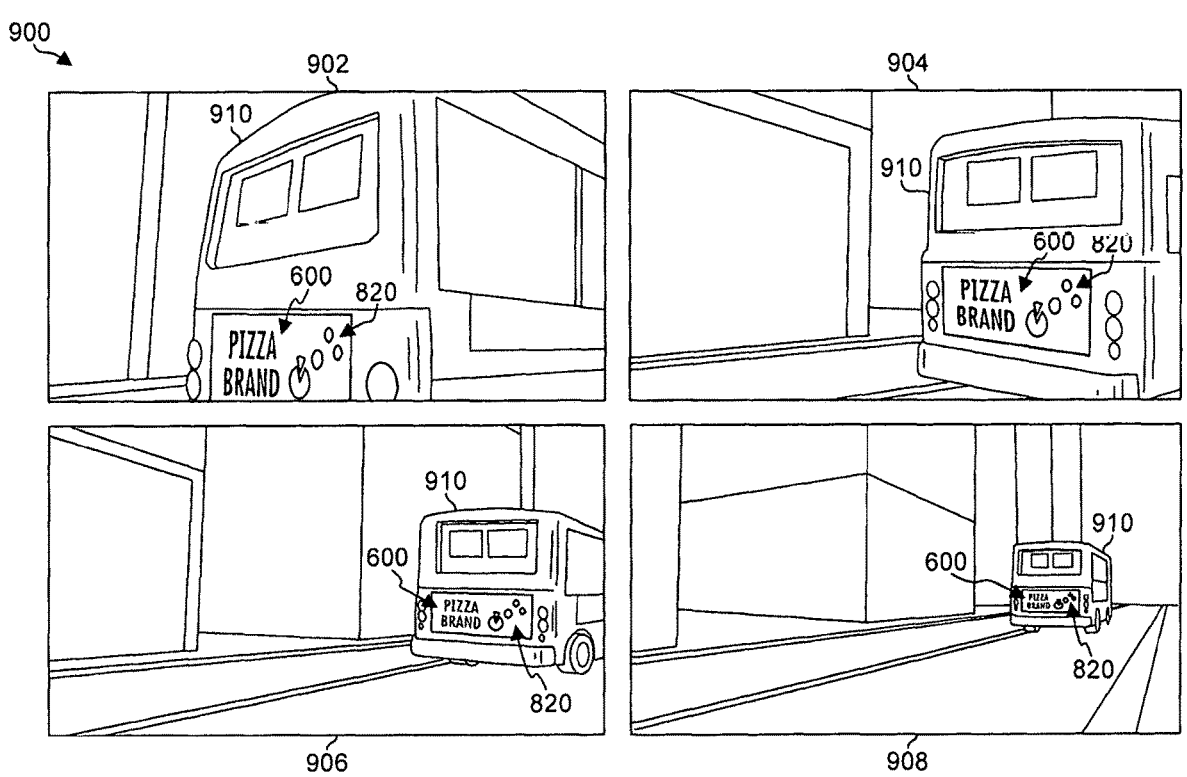

Additionally or alternatively, it should be appreciated that the media consumption device 110 may also embed a selected advertisement within an advertising enabled area 600 located within a series of frames and/or images of the media content. To do so, the media consumption device 110 may perform blocks 508-518 for each frame and/or image of the media content. For example, as illustratively shown in FIGS. 9A-9B, the media consumption device 110 determines the location of the advertising enabled area 600 positioned on a moving bus 910 located within a series 900 of images 902, 904, 906, 908. The media consumption device 110 may select a particular advertisement (e.g., the logo 820) to be embedded within the advertising enabled area 600 located within the series 900 of images 902, 904, 906, 908. In some embodiments, the media consumption device 110 also scales and/or aligns the selected advertisement 820 according to the scale and/or orientation of the advertising enabled area 600 located within the series 900 of images 902, 904, 906, 908.

Figure 10:
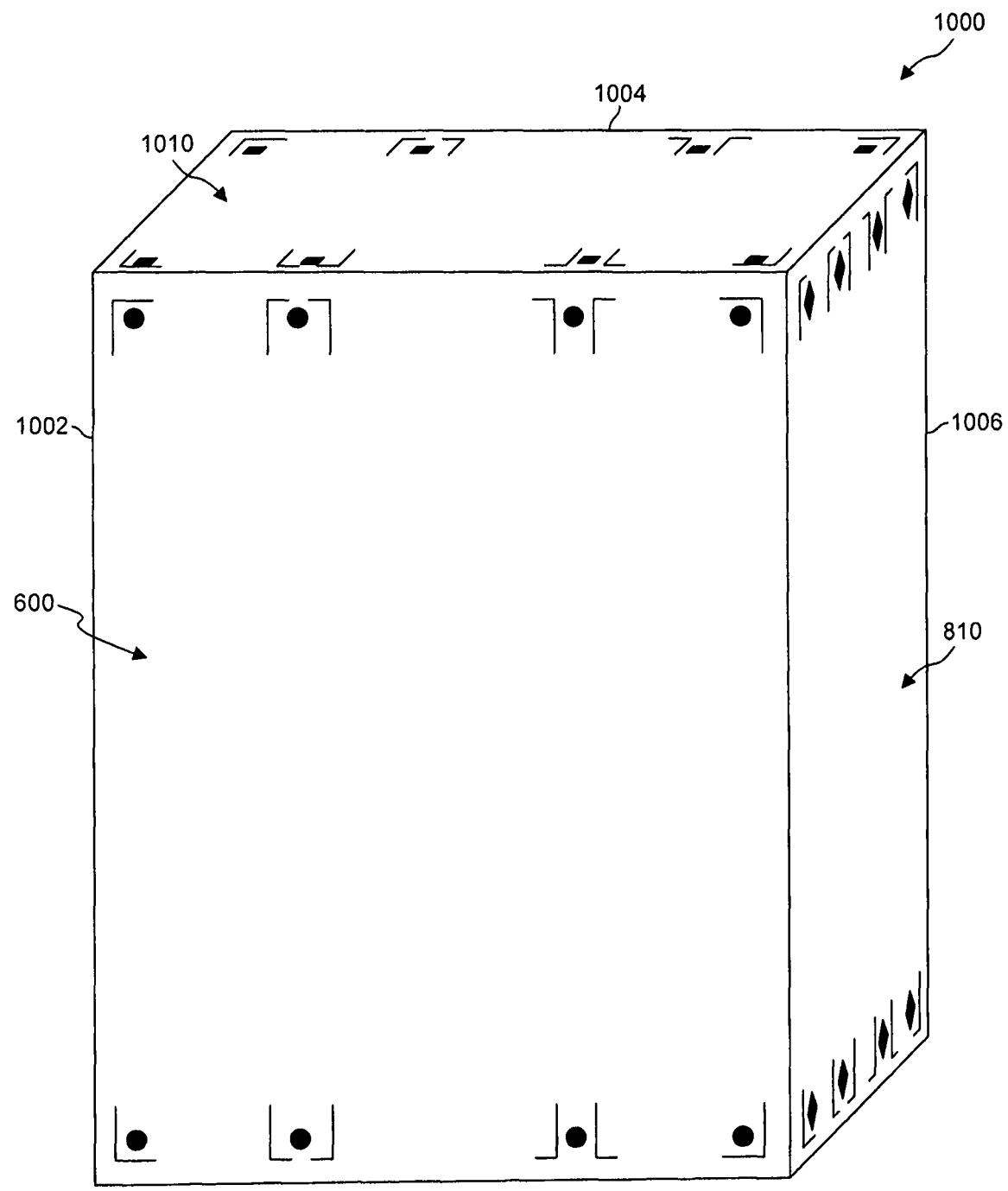
FIG. 10 is an illustrative embodiment of an object including multiple advertising enabled areas within which the media consumption device of FIGS. 1 and 2 may embed visual advertising content.

In some embodiments, the media consumption device 110 may also embed multiple selected advertisements within multiple advertising enabled areas located within an image. For example, one or more images of media content may include an object (e.g., a box, a book, etc.) having an advertising enabled area located on each side. In such embodiments, the media consumption device 110 may perform blocks 508-518 for each advertising enabled area located on each side of the object. For example, as illustratively shown in FIG. 10, one or more images of media content may include an object 1000. The object 1000 may include multiple sides/faces (e.g., sides 1002, 1004, 1006). Each of the sides 1002, 1004, 1006 may include an advertising enabled area (e.g., the advertising enabled areas 600, 810, 1010) within which different visual advertisements may later be embedded.

Figure 11:
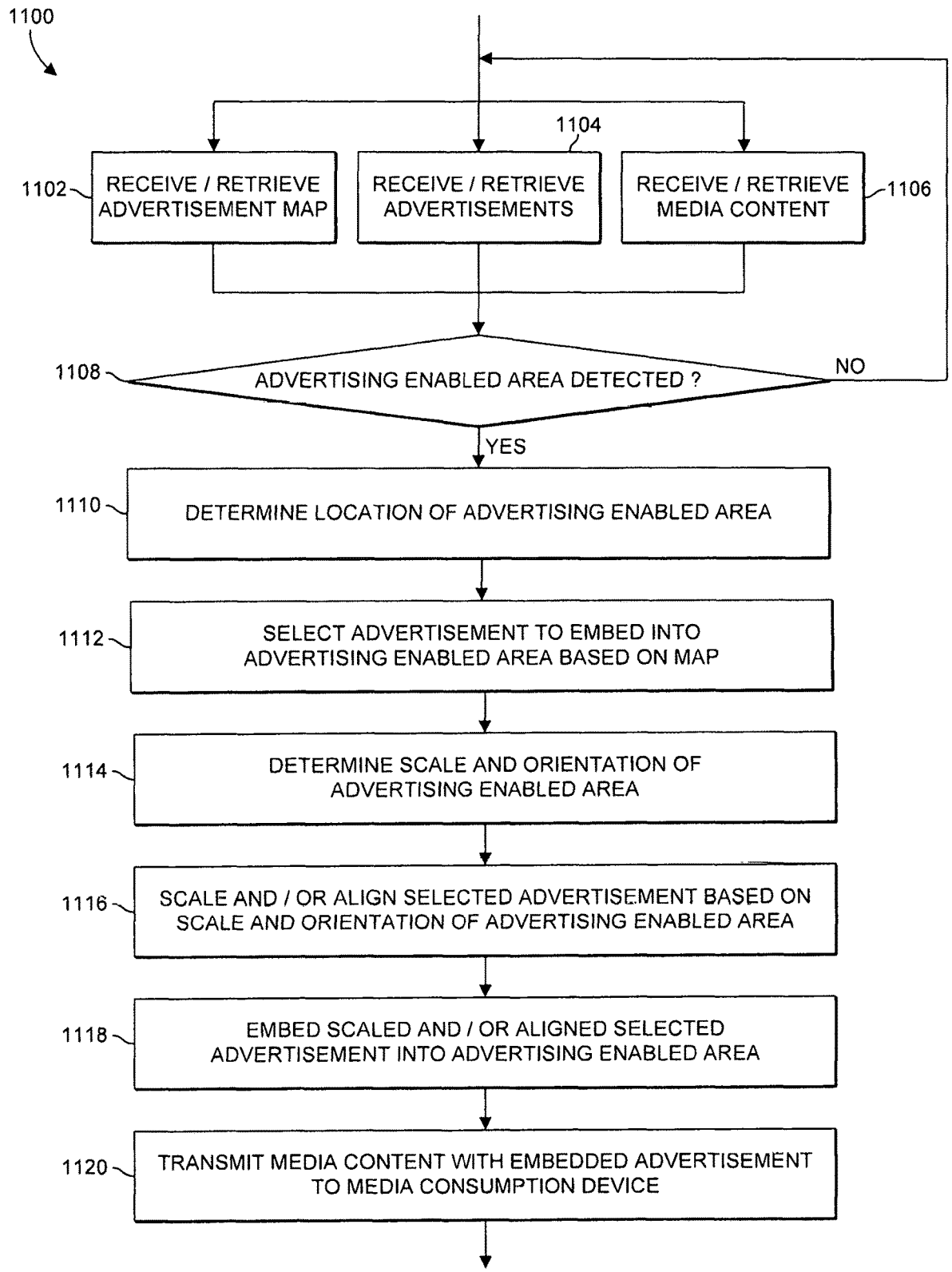
FIG. 11 is a simplified flow diagram of at least one embodiment of a method that may be executed by the remote media server of FIGS. 1 and 3 for adaptively embedding an advertisement into media content and transmitting augmented media content to the media consumption device for display.

Referring now to FIG. 11, in some embodiments, the remote media server 150 adaptively embeds visual advertisements into media content and transmits augmented media content to the media consumption device 110 for display. The method 1100 begins with block 1102 in which the remote media server 150 retrieves and/or receives the advertisement map 700. In block 1104, the remote media server 150 retrieves and/or receives one or more visual advertisements. Additionally, in block 1106, the remote media server 150 retrieves and/or receives the media content. It should be appreciated that although blocks 1102, 1104, and 1106 are shown as being performed by the remote media server 150 concurrently in the illustrative embodiment, the remote media server 150 may perform blocks 1102, 1104, and 1106 in any order. In some embodiments, the advertisement map 700, the visual advertisements, and/or the media content may be retrieved from a local storage device of the remote media server 150. Additionally or alternatively, the advertisement map 700 may be received from a another source such as, for example, a remote computing device.

In block 1108, the remote media server 150 detects whether one or more advertising enabled areas are located within an image (e.g., a frame and/or scene) of the media content. For example as illustratively shown in FIG. 8A, the remote media server 150 detects that the advertising enabled areas 600, 810 are located within the image 800 of the media content. To do so, referring back to FIG. 11, the remote media server 150 utilizes an image analysis procedure such as, for example, an object detection algorithm to detect the one or more advertising enabled areas 600, 810 included within the media content. If, in block 1108, the remote media server 150 detects one or more advertising enabled areas 600, 810 within the image 800 of the media content, the method 1100 advances to block 1110. If, however, the remote media server 150 determines instead that one or more advertising enabled areas 600, 810 have not been detected within the image 800 of the media content, the method 1100 loops back to blocks 1102, 1104, and 1106 to retrieve and/or receive new and/or additional advertisement maps, visual advertisements, and/or media content.

In block 1110, the remote media server 150 determines the location of the one or more advertising enabled areas 600, 810 (e.g., a ballpark advertising banner) existing with the image 800 of the media content. To do so, the remote media server 150 uses image analysis (e.g., object detection, feature detection, etc.) to determine the location of the one or more advertising enabled areas 600, 810 within the image 800. In some embodiments, the remote media server 150 detects one or more visual indicia 610 located on the one or more advertising enabled areas 600, 810 to facilitate determining the location and identity of the one or more advertising enabled areas 600, 810. After determining the location of the one or more advertising enabled areas 600, 810, the method 1100 advances to block 1112.

Subsequently, in block 1112, the remote media server 150 determines or otherwise selects a particular visual advertisement from a plurality of visual advertisements to be embedded within each of the one or more advertising enabled areas 600, 810 detected and located within the image 800 of the media content. To do so, the remote media server 150 determines whether one or more display conditions 702 included in the advertisement map 700 is satisfied. In some embodiments, the remote media server 150 compares user profile data 128 received from the media consumption device 110 to the display conditions 702 to determine whether any have been satisfied. It should be appreciated that the user profile data 128 may also be retrieved from a local storage of the remote media server 150 and/or another source (e.g., a remote computing device). In response to determining that one of the display conditions 702 has been satisfied, the remote media server 150 selects the advertisement corresponding to the satisfied display condition 702. After selecting the particular visual advertisement to embed within the image 800 of the media content, the method 1100 advances to block 1114.

In some embodiments, the remote media server 150 scales and/or aligns the selected advertisement based at least in part on, or otherwise as a function of, the size and orientation of the one or more advertising enabled areas 600, 810 within which the selected advertisement is to be embedded. To do so, in block 1114, the remote media server 150 first determines the scale and/or orientation of the one or more advertising enabled areas 600, 810. Subsequently, in block 1116, the remote media server 150 rescales, rotates, and/or skews (e.g., resizes and/or reorients) the visual advertisement based at least in part on the determined scale and/or orientation of the one or more advertising enabled areas 600, 810. In some embodiments, the visual advertisement resealed, rotated, and/or skewed by the remote media server 150 is embodied as a geometrically modeled digital image of the product, logo, company, and/or service to be promoted.

In block 1118, the remote media server 150 embeds (e.g., replaces, incorporates, superimposes, overlays, etc.) the scaled and oriented visual advertisement into the media content at the identified location of the one or more advertising enabled areas 600, 810. In doing so, the remote media server 150 generates augmented media content.

Subsequently, in block 1120, the remote media server 150 transmits the augmented media content including the advertisements embedded therein to the media consumption device 110. The augmented media content may then be displayed for the user on the display device 130.

EXAMPLES

Illustrative examples of the technologies disclosed herein are provided below. An embodiment of the technologies may include any one or more, and any combination of, the examples described below.

Example 1 includes a media consumption device to adaptively embed visual advertising content into media content, the media consumption device includes a communication module to (i) receive media content from a remote content provider, (ii) receive a plurality of visual advertisements from the remote content provider, and (iii) receive an advertisement map from the remote content provider, the advertisement map includes display conditions for each of the plurality of visual advertisements; an advertisement location determination module to determine a location of an advertising enabled area within an image of the media content; an advertisement selection module to select a visual advertisement of the plurality of visual advertisements to embed within the image of the media content at the determined location of the advertising enabled area based on the advertisement map; and an advertisement placement module to embed the selected visual advertisement into the image of the media content at the determined location of the advertising enabled area to generate augmented media content.

Example 2 includes the subject matter of Example 1, and wherein the advertisement placement module is further to (i) determine a scale and orientation of the advertising enabled area, and (ii) at least one of scale or align the selected visual advertisement based on the determined scale and orientation of the advertising enabled area; and wherein to embed the selected visual advertisement into the image of the media content at the determined location of the advertising enabled area includes to embed the at least one of the scaled or aligned visual advertisement into the image of the media content at the determined location of the advertising enabled area.

Example 3 includes the subject matter of any of Examples 1 or 2, and wherein the advertising enabled area within the image of the media content includes visual indicia to at least one of (i) facilitate the determination of the location of the advertising enabled area within the image of the media content, or (ii) facilitate the determination of the scale and orientation of the advertising enabled area within the image of the media content; and wherein the advertisement location determination module is further to perform a visual analysis procedure on the image to identify the visual indicia of the advertising enabled area.

Example 4 includes the subject matter of any of Examples 1-3, and wherein the visual indicia includes one or more characters, symbols, or colors to facilitate the determination of the location of the advertising enabled area within the image of the media content.

Example 5 includes the subject matter of any of Examples 1-4, and wherein the visual indicia includes a colored background to facilitate the determination of the location of the advertising enabled area within the image of the media content.

Example 6 includes the subject matter of any of Examples 1-5, and wherein the visual indicia includes one or more characters, symbols, or colors to facilitate the determination of at least one of the scale or orientation of the advertising enabled area within the image of the media content.

Example 7 includes the subject matter of any of Examples 1-6, and wherein the visual indicia includes (i) a first visual symbol placed in an upper left corner of the advertising enabled area; (ii) a second visual symbol placed in a lower left corner of the advertising enabled area; (iii) a third visual symbol placed in an upper right corner of the advertising enabled area; (iv) a fourth visual symbol placed in a lower right corner of the advertising enabled area; (v) a fifth visual symbol placed between an upper center point of the advertising enabled area and the first visual symbol; (vi) a sixth visual symbol placed between a lower center point of the advertising enabled area and the second visual symbol; (vii) a seventh visual symbol placed between the upper center point of the advertising enabled area and the third visual symbol; and (viii) an eighth visual symbol placed between the lower center point of the advertising enabled area and the fourth visual symbol.

Example 8 includes the subject matter of any of Examples 1-7, and wherein to perform an image analysis procedure on the image includes to perform at least one of a feature detection procedure, a machine vision procedure, or a computer vision procedure on the image to identify the visual indicia of the advertising enabled area.

Example 9 includes the subject matter of any of Examples 1-8, and wherein to determine a location of an advertising enabled area within an image of the media content includes to determine the location of the advertising enabled area within a first image of the media content; wherein the advertisement location determination module is further to determine the location of the advertising enabled area within a second image of the media content; wherein to determine a scale and orientation of the advertising enabled area includes to (i) determine a first scale and orientation of the advertising enabled area in the first image of the media content, and (ii) determine a second scale and orientation of the advertising enabled area in the second image of the media content; wherein to at least one of scale or align the selected visual advertisement based on the determined scale and orientation of the advertising enabled area includes to (i) at least one of scale or align the selected visual advertisement based on the determined scale and orientation of the advertising enabled area in the first image of the media content, and (ii) at least one of scale or align the selected visual advertisement based on the determined scale and orientation of the advertising enabled area in the second image of the media content; and wherein to embed the selected visual advertisement into the image of the media content at the determined location of the advertising enabled area includes to (i) embed the at least one of the scaled or aligned visual advertisement into the first image of the media content at the determined location of the advertising enabled area within the first image, and (ii) embed the at least of the scaled or aligned visual advertisement into the second image of the media content at the determined location of the advertising enabled area within the second image.

Example 10 includes the subject matter of any of Examples 1-9, and wherein to determine a location of an advertising enabled area within an image of the media content includes to determine a first location of a first advertising enabled area within a image of the media content; wherein the advertisement location determination module is further to determine a second location of a second advertising enabled area within the image of the media content; wherein to select a visual advertisement of the plurality of visual advertisements to embed within the image of the media content at the determined location of the advertising enabled area includes to (i) select, based on the advertisement map, a first visual advertisement of the plurality of visual advertisements to embed within the image of the media content at the determined first location of the first advertising enabled area, and (ii) select, based on the advertisement map, a second visual advertisement of the plurality of visual advertisements to embed within the image of the media content at the determined second location of the second advertising enabled area; and wherein to embed the selected visual advertisement into the image of the media content at the determined location of the advertising enabled area includes to (i) embed the selected first visual advertisement into the image of the media content at the determined first location of the first advertising enabled area, and (ii) embed the selected second visual advertisement into the image of the media content at the determined second location of the second advertising enabled area.

Example 11 includes the subject matter of any of Examples 1-10, and wherein the advertisement location determination module is further to (i) detect whether the advertising enabled area exists within the image of the media content, and (ii) detect whether another advertising enabled area exists within the image of the media content.

Example 12 includes the subject matter of any of Examples 1-11, and wherein each of the advertising enabled area and the another advertising enabled area within the image of the media content includes visual identification indicia, the visual identification indicia of the advertising enabled area is different from the visual identification indicia of the another advertising enabled area and uniquely identifies the advertising enabled area from the another advertising enabled area.

Example 13 includes the subject matter of any of Examples 1-12, and wherein the visual identification indicia includes one or more characters, symbols, or colors to uniquely identify the advertising enabled area from the another advertising enabled area.

Example 14 includes the subject matter of any of Examples 1-13, and wherein to embed the selected visual advertisement into the image of the media content at the determined location of the advertising enabled area to generate augmented media content includes to at least one of superimpose, overlay, replace, or incorporate the visual advertisement at the determined location of the advertising enabled area within the image of the media content.

Example 15 includes the subject matter of any of Examples 1-14, and wherein the advertisement selection module is further to determine whether user profile data corresponding to a user of the media consumption device satisfies the display conditions for one of the plurality of visual advertisements; and wherein to select a visual advertisement of the plurality of visual advertisements to embed within the image of the media content at the determined location of the advertising enabled area based on the advertisement map includes to select the one of the plurality of visual advertisements that includes the display conditions satisfied by the user profile data.

Example 16 includes the subject matter of any of Examples 1-15, and wherein the user profile data includes at least one of biographical information corresponding to the user, demographical information corresponding to the user, one or more interests of the user, online activity information corresponding to the user, or preferences of the user.

Example 17 includes a method for adaptively embedding visual advertising content into media content, the method includes receiving, on a media consumption device, media content from a remote content provider; receiving, on the media consumption device, a plurality of visual advertisements from the remote content provider; receiving, on the media consumption device, an advertisement map from the remote content provider, the advertisement map includes display conditions for each of the plurality of visual advertisements; determining, on the media consumption device, a location of an advertising enabled area within an image of the media content; selecting, on the media consumption device, a visual advertisement of the plurality of visual advertisements to embed within the image of the media content at the determined location of the advertising enabled area based on the advertisement map; and embedding, on the media consumption device, the selected visual advertisement into the image of the media content at the determined location of the advertising enabled area to generate augmented media content.

Example 18 includes the subject matter of Example 17, and further includes determining, on the media consumption device, a scale and orientation of the advertising enabled area; at least one of scaling or aligning, on the media consumption device, the selected visual advertisement based on the determined scale and orientation of the advertising enabled area; and wherein embedding the selected visual advertisement into the image of the media content at the determined location of the advertising enabled area includes embedding the at least one of the scaled or aligned visual advertisement into the image of the media content at the determined location of the advertising enabled area.

Example 19 includes the subject matter of any of Examples 17 or 18, and wherein the advertising enabled area within the image of the media content includes visual indicia to at least one of (i) facilitate locating the advertising enabled area within the image of the media content, or (ii) facilitate determining the scale and orientation of the advertising enabled area within the image of the media content; and wherein the method further includes performing, on the media consumption device, a visual analysis procedure on the image to identify the visual indicia of the advertising enabled area.

Example 20 includes the subject matter of any of Examples 17-19, and wherein the visual indicia includes one or more characters, symbols, or colors to facilitate determining the location of the advertising enabled area within the image of the media content.

Example 21 includes the subject matter of any of Examples 17-20, and wherein the visual indicia includes a colored background to facilitate determining the location of the advertising enabled area within the image of the media content.

Example 22 includes the subject matter of any of Examples 17-21, and wherein the visual indicia includes one or more characters, symbols, or colors to facilitate determining at least one of the scale or orientation of the advertising enabled area within the image of the media content.

Example 23 includes the subject matter of any of Examples 17-22, and wherein the visual indicia includes (i) a first visual symbol placed in an upper left corner of the advertising enabled area; (ii) a second visual symbol placed in a lower left corner of the advertising enabled area; (iii) a third visual symbol placed in an upper right corner of the advertising enabled area; (iv) a fourth visual symbol placed in a lower right corner of the advertising enabled area; (v) a fifth visual symbol placed between an upper center point of the advertising enabled area and the first visual symbol; (vi) a sixth visual symbol placed between a lower center point of the advertising enabled area and the second visual symbol; (vii) a seventh visual symbol placed between the upper center point of the advertising enabled area and the third visual symbol; and (viii) an eighth visual symbol placed between the lower center point of the advertising enabled area and the fourth visual symbol.

Example 24 includes the subject matter of any of Examples 17-23, and wherein performing an image analysis procedure on the image includes performing at least one of a feature detection procedure, a machine vision procedure, or a computer vision procedure on the image to identify the visual indicia of the advertising enabled area.

Example 25 includes the subject matter of any of Examples 17-24, and wherein determining a location of an advertising enabled area within an image of the media content includes determining the location of the advertising enabled area within a first image of the media content; wherein the method further includes determining, on the media consumption device, the location of the advertising enabled area within a second image of the media content; wherein determining a scale and orientation of the advertising enabled area includes (i) determining a first scale and orientation of the advertising enabled area in the first image of the media content, and (ii) determining a second scale and orientation of the advertising enabled area in the second image of the media content; wherein at least one of scaling or aligning the selected visual advertisement based on the determined scale and orientation of the advertising enabled area includes (i) at least one of scaling or aligning the selected visual advertisement based on the determined scale and orientation of the advertising enabled area in the first image of the media content, and (ii) at least one of scaling or aligning the selected visual advertisement based on the determined scale and orientation of the advertising enabled area in the second image of the media content; and wherein embedding the selected visual advertisement into the image of the media content at the determined location of the advertising enabled area includes (i) embedding the at least one of the scaled or aligned visual advertisement into the first image of the media content at the determined location of the advertising enabled area within the first image, and (ii) embedding the at least of the scaled or aligned visual advertisement into the second image of the media content at the determined location of the advertising enabled area within the second image.

Example 26 includes the subject matter of any of Examples 17-25, and wherein determining a location of an advertising enabled area within an image of the media content includes determining a first location of a first advertising enabled area within a image of the media content; wherein the method further includes determining, on the media consumption device, a second location of a second advertising enabled area within the image of the media content; wherein selecting a visual advertisement of the plurality of visual advertisements to embed within the image of the media content at the determined location of the advertising enabled area includes (i) selecting, based on the advertisement map, a first visual advertisement of the plurality of visual advertisements to embed within the image of the media content at the determined first location of the first advertising enabled area; and (ii) selecting, based on the advertisement map, a second visual advertisement of the plurality of visual advertisements to embed within the image of the media content at the determined second location of the second advertising enabled area; and wherein embedding the selected visual advertisement into the image of the media content at the determined location of the advertising enabled area includes (i) embedding the selected first visual advertisement into the image of the media content at the determined first location of the first advertising enabled area, and (ii) embedding the selected second visual advertisement into the image of the media content at the determined second location of the second advertising enabled area.

Example 27 includes the subject matter of any of Examples 17-26, and further includes detecting, on the media consumption device, whether the advertising enabled area exists within the image of the media content; and detecting, on the media consumption device, whether another advertising enabled area exists within the image of the media content.

Example 28 includes the subject matter of any of Examples 17-27, and wherein each of the advertising enabled area and the another advertising enabled area within the image of the media content includes visual identification indicia, the visual identification indicia of the advertising enabled area is different from the visual identification indicia of the another advertising enabled area and uniquely identifies the advertising enabled area from the another advertising enabled area.

Example 29 includes the subject matter of any of Examples 17-28, and wherein the visual identification indicia includes one or more characters, symbols, or colors to uniquely identify the advertising enabled area from the another advertising enabled area.

Example 30 includes the subject matter of any of Examples 17-29, and wherein embedding the selected visual advertisement into the image of the media content at the determined location of the advertising enabled area to generate augmented media content includes at least one of superimposing, overlaying, replacing, or incorporating the visual advertisement at the determined location of the advertising enabled area within the image of the media content.

Example 31 includes the subject matter of any of Examples 17-30, and further includes determining, on the media consumption device, whether user profile data corresponding to a user of the media consumption device satisfies the display conditions for one of the plurality of visual advertisements; and wherein selecting a visual advertisement of the plurality of visual advertisements to embed within the image of the media content at the determined location of the advertising enabled area based on the advertisement map includes selecting the one of the plurality of visual advertisements includes the display conditions satisfied by the user profile data.

Example 32 includes the subject matter of any of Examples 17-31, and wherein the user profile data includes at least one of biographical information corresponding to the user, demographical information corresponding to the user, one or more interests of the user, online activity information corresponding to the user, or preferences of the user.

Example 33 includes a computing device to adaptively embed visual advertising content into media content, the computing device includes a processor; and a memory having stored therein a plurality of instructions that when executed by the processor cause the computing device to perform the method of any of Examples 17-32.

Example 34 includes one or more machine readable media including a plurality of instructions stored thereon that in response to being executed result in a computing device performing the method of any of Examples 17-32.

Example 35 includes a computing device to adaptively embed visual advertising content into media content, the computing device includes means for performing the method of any of Examples 17-32.

Example 36 includes a remote media server to adaptively embed visual advertising content into media content, the remote media server includes an advertisement location determination module to determine a location of an advertising enabled area within an image of media content; an advertisement selection module to (i) retrieve a plurality of visual advertisements, (ii) retrieve an advertisement map, the advertisement map includes display conditions for each of the plurality of visual advertisements, and (iii) select a visual advertisement of the plurality of visual advertisements to embed within the image of the media content at the determined location of the advertising enabled area based on the advertisement map; an advertisement placement module to embed the selected visual advertisement into the image of the media content at the determined location of the advertising enabled area to generate augmented media content; and a communication module to transmit the augmented media content to a media consumption device for subsequent display to a user of the media consumption device.

Example 37 includes the subject matter of Example 36, and wherein the advertisement placement module is further to (i) determine a scale and orientation of the advertising enabled area, and (ii) at least one of scale or align the selected visual advertisement based on the determined scale and orientation of the advertising enabled area; and wherein to embed the selected visual advertisement into the image of the media content at the determined location of the advertising enabled area includes to embed the at least one of the scaled or aligned visual advertisement into the image of the media content at the determined location of the advertising enabled area.

Example 38 includes the subject matter of any of Examples 36 or 37, and wherein the advertising enabled area within the image of the media content includes visual indicia to at least one of (i) facilitate the determination of the location of the advertising enabled area within the image of the media content, or (ii) facilitate the determination of the scale and orientation of the advertising enabled area within the image of the media content; and wherein the advertisement location determination module is further to perform a visual analysis procedure on the image to identify the visual indicia of the advertising enabled area.

Example 39 includes the subject matter of any of Examples 36-38, and wherein the visual indicia includes one or more characters, symbols, or colors to facilitate the determination of the location of the advertising enabled area within the image of the media content.

Example 40 includes the subject matter of any of Examples 36-39, and wherein the visual indicia includes a colored background to facilitate the determination of the location of the advertising enabled area within the image of the media content.

Example 41 includes the subject matter of any of Examples 36-40, and wherein the visual indicia includes one or more characters, symbols, or colors to facilitate the determination of at least one of the scale or orientation of the advertising enabled area within the image of the media content.

Example 42 includes the subject matter of any of Examples 36-41, and wherein the visual indicia includes (i) a first visual symbol placed in an upper left corner of the advertising enabled area; (ii) a second visual symbol placed in a lower left corner of the advertising enabled area; (iii) a third visual symbol placed in an upper right corner of the advertising enabled area; (iv) a fourth visual symbol placed in a lower right corner of the advertising enabled area; (v) a fifth visual symbol placed between an upper center point of the advertising enabled area and the first visual symbol; (vi) a sixth visual symbol placed between a lower center point of the advertising enabled area and the second visual symbol; (vii) a seventh visual symbol placed between the upper center point of the advertising enabled area and the third visual symbol; and (viii) an eighth visual symbol placed between the lower center point of the advertising enabled area and the fourth visual symbol.

Example 43 includes the subject matter of any of Examples 36-42, and wherein to perform an image analysis procedure on the image includes to perform at least one of a feature detection procedure, a machine vision procedure, or a computer vision procedure on the image to identify the visual indicia of the advertising enabled area.

Example 44 includes the subject matter of any of Examples 36-43, and wherein to determine a location of an advertising enabled area within an image of the media content includes to determine the location of the advertising enabled area within a first image of the media content; wherein the advertisement location determination module is further to determine the location of the advertising enabled area within a second image of the media content; wherein to determine a scale and orientation of the advertising enabled area includes to (i) determine a first scale and orientation of the advertising enabled area in the first image of the media content, and (ii) determine a second scale and orientation of the advertising enabled area in the second image of the media content; wherein to at least one of scale or align the selected visual advertisement based on the determined scale and orientation of the advertising enabled area includes to (i) at least one of scale or align the selected visual advertisement based on the determined scale and orientation of the advertising enabled area in the first image of the media content, and (ii) at least one of scale or align the selected visual advertisement based on the determined scale and orientation of the advertising enabled area in the second image of the media content; and wherein to embed the selected visual advertisement into the image of the media content at the determined location of the advertising enabled area includes to (i) embed the at least one of the scaled or aligned visual advertisement into the first image of the media content at the determined location of the advertising enabled area within the first image, and (ii) embed the at least of the scaled or aligned visual advertisement into the second image of the media content at the determined location of the advertising enabled area within the second image.

Example 45 includes the subject matter of any of Examples 36-44, and wherein to determine a location of an advertising enabled area within an image of the media content includes to determine a first location of a first advertising enabled area within an image of the media content; wherein the advertisement location determination module is further to determine a second location of a second advertising enabled area within the image of the media content; wherein to select a visual advertisement of the plurality of visual advertisements to embed within the image of the media content at the determined location of the advertising enabled area includes to (i) select, based on the advertisement map, a first visual advertisement of the plurality of visual advertisements to embed within the image of the media content at the determined first location of the first advertising enabled area, and (ii) select, based on the advertisement map, a second visual advertisement of the plurality of visual advertisements to embed within the image of the media content at the determined second location of the second advertising enabled area; and wherein to embed the selected visual advertisement into the image of the media content at the determined location of the advertising enabled area includes to (i) embed the selected first visual advertisement into the image of the media content at the determined first location of the first advertising enabled area, and (ii) embed the selected second visual advertisement into the image of the media content at the determined second location of the second advertising enabled area.

Example 46 includes the subject matter of any of Examples 36-45, and wherein the advertisement location determination module is further to (i) detect whether the advertising enabled area exists within an image of the media content, and (ii) detect whether another advertising enabled area exists within the image of the media content.

Example 47 includes the subject matter of any of Examples 36-46, and wherein each of the advertising enabled area and the another advertising enabled area within the image of the media content includes visual identification indicia, the visual identification indicia of the advertising enabled area is different from the visual identification indicia of the another advertising enabled area and uniquely identifies the advertising enabled area from the another advertising enabled area.

Example 48 includes the subject matter of any of Examples 36-47, and wherein the visual identification indicia includes one or more characters, symbols, or colors to uniquely identify the advertising enabled area from the another advertising enabled area.

Example 49 includes the subject matter of any of Examples 36-48, and wherein to embed the selected visual advertisement into the image of the media content at the determined location of the advertising enabled area to generate augmented media content includes to at least one of superimpose, overlay, replace, or incorporate the visual advertisement at the determined location of the advertising enabled area within the image of the media content.

Example 50 includes the subject matter of any of claims 36-49, and wherein the advertisement selection module is further to determine whether user profile data corresponding to the user of the media consumption device satisfies the display conditions for one of the plurality of visual advertisements; and wherein to select a visual advertisement of the plurality of visual advertisements to embed within the image of the media content at the determined location of the advertising enabled area based on the advertisement map includes to select the one of the plurality of visual advertisements that includes the display conditions satisfied by the user profile data.

Example 51 includes the subject matter of any of Examples 36-50, and wherein the user profile data includes at least one of biographical information corresponding to the user, demographical information corresponding to the user, one or more interests of the user, online activity information corresponding to the user, or preferences of the user.

Example 52 includes a method for adaptively embedding visual advertising content into media content, the method includes retrieving, on a remote media server, media content; retrieving, on the remote media server, a plurality of visual advertisements; retrieving, on the remote media server, an advertisement map includes display conditions for each of the plurality of visual advertisements; determining, on the remote media server, a location of an advertising enabled area within an image of the media content; selecting, on the remote media server, a visual advertisement of the plurality of visual advertisements to embed within the image of the media content at the determined location of the advertising enabled area based on the advertisement map; embedding, on the remote media server, the selected visual advertisement into the image of the media content at the determined location of the advertising enabled area to generate augmented media content; and transmitting, on the remote media server, the augmented media content to a media consumption device for subsequent display to a user of the media consumption device.

Example 53 includes the subject matter of Example 52, and further includes determining, on the remote media server, a scale and orientation of the advertising enabled area; at least one of scaling or aligning, on the remote media server, the selected visual advertisement based on the determined scale and orientation of the advertising enabled area; and wherein embedding the selected visual advertisement into the image of the media content at the determined location of the advertising enabled area includes embedding the at least one of the scaled or aligned visual advertisement into the image of the media content at the determined location of the advertising enabled area.

Example 54 includes the subject matter of any of Examples 52 or 53, and wherein the advertising enabled area within the image of the media content includes visual indicia to at least one of (i) facilitate locating the advertising enabled area within the image of the media content, or (ii) facilitate determining the scale and orientation of the advertising enabled area within the image of the media content; and wherein the method further includes performing, on the remote media server, a visual analysis procedure on the image to identify the visual indicia of the advertising enabled area.

Example 55 includes the subject matter of any of Examples 52-54, and wherein the visual indicia includes one or more characters, symbols, or colors to facilitate determining the location of the advertising enabled area within the image of the media content.

Example 56 includes the subject matter of any of Examples 52-55, and wherein the visual indicia includes a colored background to facilitate determining the location of the advertising enabled area within the image of the media content.

Example 57 includes the subject matter of any of Examples 52-56, and wherein the visual indicia includes one or more characters, symbols, or colors to facilitate determining at least one of the scale or orientation of the advertising enabled area within the image of the media content.

Example 58 includes the subject matter of any of Examples 52-57, and wherein the visual indicia includes (i) a first visual symbol placed in an upper left corner of the advertising enabled area; (ii) a second visual symbol placed in a lower left corner of the advertising enabled area; (iii) a third visual symbol placed in an upper right corner of the advertising enabled area; (iv) a fourth visual symbol placed in a lower right corner of the advertising enabled area; (v) a fifth visual symbol placed between an upper center point of the advertising enabled area and the first visual symbol; (vi) a sixth visual symbol placed between a lower center point of the advertising enabled area and the second visual symbol; (vii) a seventh visual symbol placed between the upper center point of the advertising enabled area and the third visual symbol; and (viii) an eighth visual symbol placed between the lower center point of the advertising enabled area and the fourth visual symbol.

Example 59 includes the subject matter of any of Examples 52-58, and wherein performing an image analysis procedure on the image includes performing at least one of a feature detection procedure, a machine vision procedure, or a computer vision procedure on the image to identify the visual indicia of the advertising enabled area.

Example 60 includes the subject matter of any of Examples 52-59, and wherein determining a location of an advertising enabled area within an image of the media content includes determining the location of the advertising enabled area within a first image of the media content; wherein the method further includes determining, on the remote media server, the location of the advertising enabled area within a second image of the media content; wherein determining a scale and orientation of the advertising enabled area includes (i) determining a first scale and orientation of the advertising enabled area in the first image of the media content, and (ii) determining a second scale and orientation of the advertising enabled area in the second image of the media content; wherein at least one of scaling or aligning the selected visual advertisement based on the determined scale and orientation of the advertising enabled area includes (i) at least one of scaling or aligning the selected visual advertisement based on the determined scale and orientation of the advertising enabled area in the first image of the media content, and (ii) at least one of scaling or aligning the selected visual advertisement based on the determined scale and orientation of the advertising enabled area in the second image of the media content; and wherein embedding the selected visual advertisement into the image of the media content at the determined location of the advertising enabled area includes (i) embedding the at least one of the scaled or aligned visual advertisement into the first image of the media content at the determined location of the advertising enabled area within the first image, and (ii) embedding the at least of the scaled or aligned visual advertisement into the second image of the media content at the determined location of the advertising enabled area within the second image.

Example 61 includes the subject matter of any of Examples 52-60, and wherein determining a location of an advertising enabled area within an image of the media content includes determining a first location of a first advertising enabled area within an image of the media content; wherein the method further includes determining, on the remote media server, a second location of a second advertising enabled area within the image of the media content; wherein selecting a visual advertisement of the plurality of visual advertisements to embed within the image of the media content at the determined location of the advertising enabled area includes (i) selecting, based on the advertisement map, a first visual advertisement of the plurality of visual advertisements to embed within the image of the media content at the determined first location of the first advertising enabled area; and (ii) selecting, based on the advertisement map, a second visual advertisement of the plurality of visual advertisements to embed within the image of the media content at the determined second location of the second advertising enabled area; and wherein embedding the selected visual advertisement into the image of the media content at the determined location of the advertising enabled area includes (i) embedding the selected first visual advertisement into the image of the media content at the determined first location of the first advertising enabled area, and (ii) embedding the selected second visual advertisement into the image of the media content at the determined second location of the second advertising enabled area.

Example 62 includes the subject matter of any of Examples 52-61, and further includes detecting, on the remote media server, whether the advertising enabled area exists within the image of the media content; and detecting, on the remote media server, whether another advertising enabled area exists within the image of the media content.

Example 63 includes the subject matter of any of Examples 52-62, and wherein each of the advertising enabled area and the another advertising enabled area within the image of the media content includes visual identification indicia, the visual identification indicia of the advertising enabled area is different from the visual identification indicia of the another advertising enabled area and uniquely identifies the advertising enabled area from the another advertising enabled area.

Example 64 includes the subject matter of any of Examples 52-63, and wherein the visual identification indicia includes one or more characters, symbols, or colors to uniquely identify the advertising enabled area from the another advertising enabled area.

Example 65 includes the subject matter of any of Examples 52-64, and wherein embedding the selected visual advertisement into the image of the media content at the determined location of the advertising enabled area to generate augmented media content includes at least one of superimposing, overlaying, replacing, or incorporating the visual advertisement at the determined location of the advertising enabled area within the image of the media content.

Example 66 includes the subject matter of any of Examples 52-65, and further includes determining, on the remote media server, whether user profile data corresponding to the user of the media consumption device satisfies the display conditions for one of the plurality of visual advertisements; and wherein selecting a visual advertisement of the plurality of visual advertisements to embed within the image of the media content at the determined location of the advertising enabled area based on the advertisement map includes selecting the one of the plurality of visual advertisements includes the display conditions satisfied by the user profile data.

Example 67 includes the subject matter of any of Examples 52-66, and wherein the user profile data includes at least one of biographical information corresponding to the user, demographical information corresponding to the user, one or more interests of the user, online activity information corresponding to the user, or preferences of the user.

Example 68 includes a remote media server to adaptively embed visual advertising content into media content, the remote media server includes a processor; and a memory having stored therein a plurality of instructions that when executed by the processor cause the remote media server to perform the method of any of Examples 52-67.

Example 69 includes one or more machine readable media including a plurality of instructions stored thereon that in response to being executed result in a remote media server performing the method of any of Examples 52-67.

Example 70 includes a remote media server to adaptively embed visual advertising content into media content, the remote media server includes means for performing the method of any of Examples 52-67.

Example 71 includes a remote media server to generate visual advertising content to be adaptively embedded into media content, the remote media server includes a model generation module to geometrically model a digital image to generate a visual advertisement; a advertisement map generation module to generate an advertisement map includes display conditions for each of a plurality of visual advertisements; and a communication module to (i) transmit media content to a media consumption device, (ii) transmit the plurality of visual advertisements to the media consumption device, and (iii) transmit the advertisement map from the media consumption device.

Example 72 includes the subject matter of Example 71, and wherein an image of the media content includes an advertising enabled area within which one of the plurality of visual advertisements is subsequently embedded.

Example 73 includes the subject matter of any of Examples 71 or 72, and wherein the advertisement map further includes visual indicia to facilitate subsequent determination, by the media consumption device, of a location of the advertising enabled area within the image of the media content.

Example 74 includes the subject matter of any of Examples 71-73, and wherein the visual indicia includes one or more characters, symbols, or colors to facilitate subsequent determination of the location of the advertising enabled area within the image of the media content.

Example 75 includes the subject matter of any of Examples 71-74, and wherein the visual indicia includes a colored background to facilitate the subsequent determination of the location of the advertising enabled area within the image of the media content.

Example 76 includes the subject matter of any of Examples 71-75, and wherein an image of the media content includes (i) a first advertising enabled area within which a first visual advertisement is subsequently embedded, and (ii) a second advertising enabled area within which a second visual advertisement is subsequently embedded.

Example 77 includes the subject matter of any of Examples 71-76, and wherein each of the first and second advertising enabled areas within the image of the media content includes visual identification indicia, the visual identification indicia of the first advertising enabled area is different from the visual identification indicia of the second advertising enabled area and uniquely identifies the first advertising enabled area from the second advertising enabled area.

Example 78 includes the subject matter of any of Examples 71-77, and wherein the visual identification indicia includes one or more characters, symbols, or colors to uniquely identify the first advertising enabled area from the second advertising enabled area.

Example 79 includes the subject matter of any of Examples 71-78, and wherein the display conditions define a set of criteria that user profile data corresponding to a user of the media consumption device must satisfy.

Example 80 includes the subject matter of any of Examples 71-79, and wherein the user profile data includes at least one of biographical information corresponding to the user, demographical information corresponding to the user, one or more interests of the user, online activity information corresponding to the user, or preferences of the user.

Example 81 includes a method for generating visual advertising content to be adaptively embedded into media content, the method includes a model generation module to geometrically model a digital image to generate a visual advertisement; a advertisement map generation module to generate an advertisement map includes display conditions for each of a plurality of visual advertisements; and a communication module to (i) transmit media content to a media consumption device, (ii) transmit the plurality of visual advertisements to the media consumption device, and (iii) transmit the advertisement map from the media consumption device.

Example 82 includes the subject matter of Example 81, and wherein an image of the media content includes an advertising enabled area within which one of the plurality of visual advertisements is subsequently embedded.

Example 83 includes the subject matter of any of Examples 81 or 82, and wherein the advertisement map further includes visual indicia to facilitate subsequent determination, by the media consumption device, of a location of the advertising enabled area within the image of the media content.

Example 84 includes the subject matter of any of Examples 81-83, and wherein the visual indicia includes one or more characters, symbols, or colors to facilitate subsequent determination of the location of the advertising enabled area within the image of the media content.

Example 85 includes the subject matter of any of Examples 81-84, and wherein the visual indicia includes a colored background to facilitate the subsequent determination of the location of the advertising enabled area within the image of the media content.

Example 86 includes the subject matter of any of Examples 81-85, and wherein an image of the media content includes (i) a first advertising enabled area within which a first visual advertisement is subsequently embedded, and (ii) a second advertising enabled area within which a second visual advertisement is subsequently embedded.

Example 87 includes the subject matter of any of Examples 81-86, and wherein each of the first and second advertising enabled areas within the image of the media content includes visual identification indicia, the visual identification indicia of the first advertising enabled area is different from the visual identification indicia of the second advertising enabled area and uniquely identifies the first advertising enabled area from the second advertising enabled area.

Example 88 includes the subject matter of any of Examples 81-87, and wherein the visual identification indicia includes one or more characters, symbols, or colors to uniquely identify the first advertising enabled area from the second advertising enabled area.

Example 89 includes the subject matter of any of Examples 81-88, and wherein the display conditions define a set of criteria that user profile data corresponding to a user of the media consumption device must satisfy.

Example 90 includes the subject matter of any of Examples 81-89, and wherein the user profile data includes at least one of biographical information corresponding to the user, demographical information corresponding to the user, one or more interests of the user, online activity information corresponding to the user, or preferences of the user.

Example 91 includes a remote media server to generate visual advertising content to be adaptively embedded into media content, the remote media server includes a processor; and a memory having stored therein a plurality of instructions that when executed by the processor cause the remote media server to perform the method of any of Examples 81-90.

Example 92 includes one or more machine readable media including a plurality of instructions stored thereon that in response to being executed result in a remote media server performing the method of any of Examples 81-90.

Example 93 includes a remote media server to generate visual advertising content to be adaptively embedded into media content, the remote media server includes means for performing the method of any of Examples 81-90.

What is claimed is:

1. A media consumption device to adaptively embed visual advertising content into media content, the media consumption device comprising:
    one or more processors;
    a memory having a plurality of instructions stored thereon that, when executed by the one or more processors, causes the media consumption device to:
    receive digital media content from a remote content provider remote from the media consumption device, wherein the digital media content includes a plurality of visual peripheral markers positioned to define a periphery of an advertising enabled area of the digital media content,
    receive a plurality of visual advertisements from the remote content provider,
    receive an advertisement map from the remote content provider, wherein the advertisement map is pre-generated by the remote content provider remote from the media consumption device and comprises: (i) a display condition for each of the plurality of visual advertisements, wherein each display condition defines one or more rules that must be satisfied for the corresponding visual advertisement to be selected for embedment into the digital media content, and (ii) a display area locator for each of the plurality of visual advertisement, wherein each display area locator defines a visual indicia that corresponds to the visual peripheral markers of the advertising enabled area of the digital media content and at least two of the display area locators of the advertisement map are different from each other;
    determine whether user profile data corresponding to a user of the media consumption device satisfies the display conditions for one of the plurality of visual advertisements, wherein the display conditions include demographical information of the user;
    determine a location of the advertising enabled area within an image of the digital media content, wherein the advertising enabled area comprises (i) the visual indicia and (ii) the plurality of visual peripheral markers;
    select a visual advertisement of the plurality of visual advertisements to embed within the image of the digital media content at the determined location of the advertising enabled area based on a determination that (i) the visual indicia of the display area locator of the advertisement map corresponding to the selected visual advertisement matches the visual indicia of the advertising enabled area, and (ii) the display condition of the advertisement map corresponding to the selected visual advertisement is satisfied;
    determine a scale and orientation of the advertising enabled area using the plurality of visual peripheral markers of the advertising enabled area;
    at least one of scale or align the selected visual advertisement based on the determined scale and orientation of the advertising enabled area; and
    embed the selected visual advertisement into the image of the digital media content at the determined location of the advertising enabled area to generate augmented media content.

2. The media consumption device of claim 1, wherein to embed the selected visual advertisement into the image of the media content at the determined location of the advertising enabled area comprises to embed the at least one of the scaled or aligned visual advertisement into the image of the media content at the determined location of the advertising enabled area.

3. The media consumption device of claim 2, wherein the plurality of instructions, when executed, further cause the media consumption device to perform a visual analysis procedure on the image to identify the visual indicia of the advertising enabled area.

4. The media consumption device of claim 3, wherein the visual indicia comprises one or more characters, symbols, or colors to facilitate the determination of the location of the advertising enabled area within the image of the media content, and wherein the plurality of visual peripheral markers comprises one or more characters, symbols, or colors to facilitate the determination of at least one of the scale or orientation of the advertising enabled area within the image of the media content.

5. The media consumption device of claim 4, wherein the visual indicia comprises a colored background to facilitate the determination of the location of the advertising enabled area within the image of the media content.

6. The media consumption device of claim 4, wherein the plurality of visual peripheral markers comprises: (i) a first visual symbol placed in an upper left corner of the advertising enabled area; (ii) a second visual symbol placed in a lower left corner of the advertising enabled area; (iii) a third visual symbol placed in an upper right corner of the advertising enabled area; (iv) a fourth visual symbol placed in a lower right corner of the advertising enabled area; (v) a fifth visual symbol placed between an upper center point of the advertising enabled area and the first visual symbol; (vi) a sixth visual symbol placed between a lower center point of the advertising enabled area and the second visual symbol; (vii) a seventh visual symbol placed between the upper center point of the advertising enabled area and the third visual symbol; and (viii) an eighth visual symbol placed between the lower center point of the advertising enabled area and the fourth visual symbol.

7. The media consumption device of claim 2, wherein to determine a location of an advertising enabled area within an image of the media content comprises to determine the location of the advertising enabled area within a first image of the media content;
wherein the plurality of instructions, when executed, further cause the media consumption device to determine the location of the advertising enabled area within a second image of the media content;
wherein to determine a scale and orientation of the advertising enabled area comprises to: (i) determine a first scale and orientation of the advertising enabled area in the first image of the media content, and (ii) determine a second scale and orientation of the advertising enabled area in the second image of the media content;
wherein to at least one of scale or align the selected visual advertisement based on the determined scale and orientation of the advertising enabled area comprises to: (i) at least one of scale or align the selected visual advertisement based on the determined scale and orientation of the advertising enabled area in the first image of the media content, and (ii) at least one of scale or align the selected visual advertisement based on the determined scale and orientation of the advertising enabled area in the second image of the media content; and
wherein to embed the selected visual advertisement into the image of the media content at the determined location of the advertising enabled area comprises to: (i) embed the at least one of the scaled or aligned visual advertisement into the first image of the media content at the determined location of the advertising enabled area within the first image, and (ii) embed the at least of the scaled or aligned visual advertisement into the second image of the media content at the determined location of the advertising enabled area within the second image.

8. The media consumption device of claim 1, wherein to determine a location of an advertising enabled area within an image of the media content comprises to determine a first location of a first advertising enabled area within a image of the media content;
wherein the plurality of instructions, when executed, further cause the media consumption device to determine a second location of a second advertising enabled area within the image of the media content;
wherein to select a visual advertisement of the plurality of visual advertisements to embed within the image of the media content at the determined location of the advertising enabled area comprises to: (i) select, based on the advertisement map, a first visual advertisement of the plurality of visual advertisements to embed within the image of the media content at the determined first location of the first advertising enabled area, and (ii) select, based on the advertisement map, a second visual advertisement of the plurality of visual advertisements to embed within the image of the media content at the determined second location of the second advertising enabled area; and
wherein to embed the selected visual advertisement into the image of the media content at the determined location of the advertising enabled area comprises to: (i) embed the selected first visual advertisement into the image of the media content at the determined first location of the first advertising enabled area, and (ii) embed the selected second visual advertisement into the image of the media content at the determined second location of the second advertising enabled area.

9. The media consumption device of claim 8, wherein to select a visual advertisement of the plurality of visual advertisements to embed within the image of the media content at the determined location of the advertising enabled area based on the advertisement map comprises to select the one of the plurality of visual advertisements that comprises the display conditions satisfied by the user profile data.

10. A method for adaptively embedding visual advertising content into media content, the method comprising:
receiving, on a media consumption device, digital media content from a remote content provider remote from the media consumption device, wherein the digital media content includes a plurality of visual peripheral markers positioned to define a periphery of an advertising enabled area of the digital media content;
receiving, on the media consumption device, a plurality of visual advertisements from the remote content provider;
receiving, on the media consumption device, an advertisement map from the remote content provider, wherein the advertisement map is pre-generated by the remote content provider remote from the media consumption device and comprises: (i) a display condition for each of the plurality of visual advertisements, wherein each display condition defines one or more rules that must be satisfied for the corresponding visual advertisement to be selected for embedment into the digital media content, and (ii) a display area locator for each of the plurality of visual advertisement, wherein each display area locator defines a visual indicia that corresponds to the visual peripheral markers of the advertising enabled area of the digital media content and at least two of the display area locators of the advertisement map are different from each other;

determine whether user profile data corresponding to a user of the media consumption device satisfies the display conditions for one of the plurality of visual advertisements, wherein the display conditions include demographical information of the user;

determining, on the media consumption device, a location of an advertising enabled area within an image of the media content, wherein the advertising enabled area comprises (i) the visual indicia and (ii) the plurality of visual peripheral markers;

selecting, on the media consumption device, a visual advertisement of the plurality of visual advertisements to embed within the image of the digital media content at the determined location of the advertising enabled area based on a determination that (i) the visual indicia of the display area locator of the advertisement map corresponding to the selected visual advertisement matches the visual indicia of the advertising enabled area, and (ii) the display condition of the advertisement map corresponding to the selected visual advertisement is satisfied;

determining, on the media consumption device, a scale and orientation of the advertising enabled area using the plurality of visual peripheral markers of the advertising enabled area;

at least one of scaling or aligning, on the media consumption device, the selected visual advertisement based on the determined scale and orientation of the advertising enabled area; and embedding, on the media consumption device, the selected visual advertisement into the image of the digital media content at the determined location of the advertising enabled area to generate augmented media content.

11. The method of claim 10, further comprising:
wherein embedding the selected visual advertisement into the image of the media content at the determined location of the advertising enabled area comprises embedding the at least one of the scaled or aligned visual advertisement into the image of the media content at the determined location of the advertising enabled area.

12. The method of claim 11, wherein the method further comprising performing, on the media consumption device, a visual analysis procedure on the image to identify the visual indicia of the advertising enabled area.

13. The method of claim 12, wherein the visual indicia comprises one or more characters, symbols, or colors facilitate the determination of the location of the advertising enabled area within the image of the media content, and wherein the plurality of visual peripheral markers comprises one or more characters, symbols, or colors to facilitate the determination of at least one of the scale or orientation of the advertising enabled area within the image of the media content.

14. The method of claim 10, wherein determining a location of an advertising enabled area within an image of the media content comprises determining a first location of a first advertising enabled area within a image of the media content;

wherein the method further comprising determining, on the media consumption device, a second location of a second advertising enabled area within the image of the media content;

wherein selecting a visual advertisement of the plurality of visual advertisements to embed within the image of the media content at the determined location of the advertising enabled area comprises: (i) selecting, based on the advertisement map, a first visual advertisement of the plurality of visual advertisements to embed within the image of the media content at the determined first location of the first advertising enabled area; and (ii) selecting, based on the advertisement map, a second visual advertisement of the plurality of visual advertisements to embed within the image of the media content at the determined second location of the second advertising enabled area; and wherein embedding the selected visual advertisement into the image of the media content at the determined location of the advertising enabled area comprises: (i) embedding the selected first visual advertisement into the image of the media content at the determined first location of the first advertising enabled area, and (ii) embedding the selected second visual advertisement into the image of the media content at the determined second location of the second advertising enabled area.

15. The method of claim 10, further comprising:
wherein selecting a visual advertisement of the plurality of visual advertisements to embed within the image of the media content at the determined location of the advertising enabled area based on the advertisement map comprises selecting the one of the plurality of visual advertisements comprising the display conditions satisfied by the user profile data.

16. One or more non-transitory, machine readable media comprising a plurality of instructions stored thereon that in response to being executed result in a computing device:

receiving digital media content from a remote content provider remote from the media consumption device, wherein the digital media content includes a plurality of visual peripheral markers positioned to define a periphery of an advertising enabled area of the digital media content;

receiving a plurality of visual advertisements from the remote content provider;

receiving an advertisement map from the remote content provider, wherein the advertisement map is pre-generated by the remote content provider remote from the media consumption device and comprises: (i) a display condition for each of the plurality of visual advertisements, wherein each display condition defines one or more rules that must be satisfied for the corresponding visual advertisement to be selected for embedment into the digital media content, and (ii) a display area locator for each of the plurality of visual advertisement, wherein each display area locator defines a visual indicia that corresponds to the visual peripheral markers of the advertising enabled area of the digital media content and at least two of the display area locators of the advertisement map are different from each other;

determine whether user profile data corresponding to a user of the media consumption device satisfies the display conditions for one of the plurality of visual advertisements, wherein the display conditions include demographical information of the user;

determining a location of the advertising enabled area within an image of the digital media content, wherein the advertising enabled area comprises (i) the visual indicia and (ii) the plurality of visual peripheral markers;

selecting a visual advertisement of the plurality of visual advertisements to embed within the image of the digital media content at the determined location of the advertising enabled area based on a determination that (i) the visual indicia of the display area locator of the advertisement map corresponding to the selected visual advertisement matches the visual indicia of the advertising enabled area, and (ii) the display condition of the advertisement map corresponding to the selected visual advertisement is satisfied;

determining a scale and orientation of the advertising enabled area using the plurality of visual peripheral markers of the advertising enabled area, at least one of a scaling or aligning the selected visual advertisement based on the determined scale and orientation of the advertising enabled area; and embedding the selected visual advertisement into the image of the digital media content at the determined location of the advertising enabled area to generate augmented media content.

17. The one or more non-transitory, machine readable media of claim 16, wherein embedding the selected visual advertisement into the image of the media content at the determined location of the advertising enabled area comprises embedding the at least one of the scaled or aligned visual advertisement into the image of the media content at the determined location of the advertising enabled area.

18. The one or more non-transitory, machine readable media of claim 17 wherein the plurality of instructions further result in the computing device performing a visual analysis procedure on the image to identify the visual indicia of the advertising enabled area.

19. The one or more non-transitory, machine readable media of claim 18, wherein the visual indicia comprises one or more characters, symbols, or colors to facilitate the determination of the location of the advertising enabled area within the image of the media content, and wherein the plurality of visual peripheral markers comprises one or more characters, symbols, or colors to facilitate the determination of at least one of the scale or orientation of the advertising enabled area within the image of the media content.

20. The one or more non-transitory, machine readable media of claim 17, wherein determining a location of an advertising enabled area within an image of the media content comprises determining the location of the advertising enabled area within a first image of the media content;

wherein the plurality of instructions further result in the computing device determining the location of the advertising enabled area within a second image of the media content;

wherein determining a scale and orientation of the advertising enabled area comprises: (i) determining a first scale and orientation of the advertising enabled area in the first image of the media content, and (ii) determining a second scale and orientation of the advertising enabled area in the second image of the media content;

wherein at least one of scaling or aligning the selected visual advertisement based on the determined scale and orientation of the advertising enabled area comprises: (i) at least one of scaling or aligning the selected visual advertisement based on the determined scale and orientation of the advertising enabled area in the first image of the media content, and (ii) at least one of scaling or aligning the selected visual advertisement based on the determined scale and orientation of the advertising enabled area in the second image of the media content; and wherein embedding the selected visual advertisement into the image of the media content at the determined location of the advertising enabled area comprises: (i) embedding the at least one of the scaled or aligned visual advertisement into the first image of the media content at the determined location of the advertising enabled area within the first image, and (ii) embedding the at least of the scaled or aligned visual advertisement into the second image of the media content at the determined location of the advertising enabled area within the second image.

21. The one or more non-transitory, machine readable media of claim 16, wherein determining a location of an advertising enabled area within an image of the media content comprises determining a first location of a first advertising enabled area within a image of the media content;

wherein the plurality of instructions further result in the computing device determining a second location of a second advertising enabled area within the image of the media content;

wherein selecting a visual advertisement of the plurality of visual advertisements to embed within the image of the media content at the determined location of the advertising enabled area comprises: (i) selecting, based on the advertisement map, a first visual advertisement of the plurality of visual advertisements to embed within the image of the media content at the determined first location of the first advertising enabled area; and (ii) selecting, based on the advertisement map, a second visual advertisement of the plurality of visual advertisements to embed within the image of the media content at the determined second location of the second advertising enabled area; and wherein embedding the selected visual advertisement into the image of the media content at the determined location of the advertising enabled area comprises: (i) embedding the selected first visual advertisement into the image of the media content at the determined first location of the first advertising enabled area, and (ii) embedding the selected second visual advertisement into the image of the media content at the determined second location of the second advertising enabled area.

22. The one or more non-transitory, machine readable media of claim 16, wherein selecting a visual advertisement of the plurality of visual advertisements to embed within the image of the media content at the determined location of the advertising enabled area based on the advertisement map comprises selecting the one of the plurality of visual advertisements comprising the display conditions satisfied by the user profile data.

* * * * *